US011388771B2

(12) United States Patent
da Silva et al.

(10) Patent No.: US 11,388,771 B2
(45) Date of Patent: Jul. 12, 2022

(54) METHODS FOR SUSPENDING INACTIVE WHEN RESUMING AND RESUMING INACTIVE WHEN SUSPENDING

(71) Applicant: Telefonaktiebolaget LM Ericsson (publ), Stockholm (SE)

(72) Inventors: Icaro L. J. da Silva, Solna (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 16/466,596

(22) PCT Filed: May 7, 2019

(86) PCT No.: PCT/SE2019/050402
§ 371 (c)(1),
(2) Date: Jun. 4, 2019

(87) PCT Pub. No.: WO2019/216811
PCT Pub. Date: Nov. 14, 2019

(65) Prior Publication Data
US 2021/0127449 A1    Apr. 29, 2021

Related U.S. Application Data

(60) Provisional application No. 62/668,016, filed on May 7, 2018.

(51) Int. Cl.
*H04W 76/27* (2018.01)
*H04W 76/19* (2018.01)
(Continued)

(52) U.S. Cl.
CPC ......... *H04W 76/27* (2018.02); *H04W 68/005* (2013.01); *H04W 76/11* (2018.02); *H04W 76/19* (2018.02); *H04W 76/30* (2018.02)

(58) Field of Classification Search
CPC ... H04W 68/005; H04W 76/11; H04W 76/19; H04W 76/27; H04W 76/30
See application file for complete search history.

(56) References Cited

U.S. PATENT DOCUMENTS 9,155,007 B2   10/2015   Jung et al.
2012/0092998 A1*   4/2012   Chang ................... H04W 24/10
                                                                370/241
(Continued)

FOREIGN PATENT DOCUMENTS

JP    2021502785 A    1/2021
WO    2019096267 A1   5/2019

OTHER PUBLICATIONS

Ericsson; "Signaling reduction for UE state transitions"; SA WG2 Meeting #110 Jun. 6-10, 2015, Dubrovnik, Croatia S2-152207 (Year: 2015).*

(Continued)

*Primary Examiner* — Gary Mui
(74) *Attorney, Agent, or Firm* — Murphy, Bilak & Homiller, PLLC

(57) ABSTRACT

According to an aspect, a wireless device, operating in a wireless network, handles transitions from Radio Resource Control, RRC, connected state to an RRC inactive state. The wireless device receives (1502), from the wireless network, a message indicating either that the wireless device is to enter the RRC inactive state or that the wireless device is to remain in the RRC inactive state. The wireless device, responsive to the message, uses (1504), for inactive state operation, at least one previously stored inactive state parameter corresponding to a parameter omitted from the message.

19 Claims, 21 Drawing Sheets

(51) Int. Cl.
  *H04W 76/30* (2018.01)
  *H04W 76/11* (2018.01)
  *H04W 68/00* (2009.01)

(56) References Cited

U.S. PATENT DOCUMENTS

| | | | | |
|---|---|---|---|---|
| 2014/0313889 | A1* | 10/2014 | Jeong | H04W 28/0284 370/230 |
| 2018/0092156 | A1* | 3/2018 | Kim | H04W 72/0406 |
| 2018/0234838 | A1* | 8/2018 | Mildh | H04W 60/02 |
| 2018/0234941 | A1* | 8/2018 | Kim | H04W 76/19 |
| 2018/0288746 | A1* | 10/2018 | Zhang | H04L 1/0031 |
| 2019/0082490 | A1* | 3/2019 | Zhang | H04W 76/27 |
| 2019/0191483 | A1* | 6/2019 | Ryoo | H04W 76/30 |
| 2019/0289570 | A1* | 9/2019 | Kim | H04W 76/19 |
| 2019/0306784 | A1* | 10/2019 | Chen | H04W 76/18 |
| 2019/0320488 | A1* | 10/2019 | Mildh | H04W 76/19 |
| 2019/0327711 | A1* | 10/2019 | Zhang | H04W 76/27 |
| 2019/0342804 | A1* | 11/2019 | Futaki | H04W 36/14 |
| 2019/0387548 | A1* | 12/2019 | Kim | H04W 72/0406 |
| 2020/0021978 | A1* | 1/2020 | Chai | H04W 12/03 |
| 2020/0022083 | A1* | 1/2020 | Jin | H04W 76/11 |
| 2020/0029237 | A1* | 1/2020 | Kim | H04W 24/10 |
| 2020/0045591 | A1* | 2/2020 | Yokoyama | H04W 48/20 |
| 2020/0045633 | A1* | 2/2020 | Ode | H04W 76/28 |
| 2020/0084825 | A1* | 3/2020 | Yang | H04W 76/30 |
| 2020/0120742 | A1* | 4/2020 | Mildh | H04W 24/10 |
| 2020/0178113 | A1* | 6/2020 | Jin | H04W 28/0268 |
| 2020/0178206 | A1* | 6/2020 | Turtinen | H04W 52/0229 |
| 2020/0221524 | A1* | 7/2020 | Jiang | H04W 48/06 |
| 2020/0267775 | A1* | 8/2020 | Wang | H04W 74/002 |
| 2020/0280894 | A1* | 9/2020 | Koskinen | H04W 72/048 |
| 2020/0344670 | A1* | 10/2020 | Li | H04W 48/08 |
| 2020/0374969 | A1* | 11/2020 | Fujishiro | H04W 76/27 |
| 2021/0127445 | A1* | 4/2021 | da Silva | H04W 76/30 |
| 2021/0235265 | A1* | 7/2021 | Stattin | H04W 76/27 |

OTHER PUBLICATIONS

3GPP, "3rd Generation Partnership Project; Technical Specification Group Radio Access Network NR Radio Resource Control (RRC) protocol specification (Release 15)", 3GPP TS 38.331 V15.0.0, Dec. 2017, pp. 1-188.

3GPP, "3rd Generation Partnership Project; Technical Specification Group Radio Access Network; NR; User Equipment (UE) procedures in Idle mode and RRC Inactive state (Release 15)", 3GPP TS 38.304 V15.3.0, Mar. 2019, pp. 1-29.

3GPP, "3rd Generation Partnership Project; Technical Specification Group Radio Access Network; Study on New Radio Access Technology; Radio Access Architecture and Interfaces (Release 14)", 3GPP TR 38.801 V1.2.0, Feb. 2017, pp. 1-90.

Da Silva, Icaro Leonardo, et al., "A Novel State Model for 5G Radio Access Networks", IEEE International Conference on Communications Workshops, May 23, 2016, pp. 1-6.

Unknown, Author, "Inactivity-based transition to a power efficient state", 3GPP Tsg-ran WG2 Meeting #98, R2-1704146, Hangzhou, China, May 15-19, 2017, pp. 1-3.

Unknown, Author, "RRC Connection Suspend and Resume", 3GPP TSG-RAN WG2 NB-IOT Ad-hoc Meeting, TdocR2-160475, Budapest, Hungary, Jan. 19-21, 2016, pp. 1-14.

Unknown, Author, "CONNECTED to INACTIVE state transition", 3GPP TSG-RAN WG2 #98 Tdoc R2-1704119 (revision of R2-1702811), Hangzhou, P.R. of China, May 15-19, 2017, 1-7.

Unknown, Author, "INACTIVE to CONNECTED state transitions", 3GPP TSG-RAN WG2 #98, Tdoc R2-1704116 (revision of R2-1702808), Hangzhou, P.R. of China, May 15-19, 2017, 1-6.

Unknown, Author, "NR RRC States overview and remaining open issues", 3GPP TSG-RAN WG2 #101 Tdoc R2-1802361 (Resubmission of R2-1800419), Athens, Greece, Feb. 26-Mar. 2, 2018, 1-15.

Unknown, Author, "State transition from RRC_CONNECTED to RRC_INACTIVE", 3GPP TSG-RAN WG2 Meeting #99 R2-1709058, Berlin, Germany, Aug. 21-25, 2017, 1-3.

* cited by examiner

METHODS FOR SUSPENDING INACTIVE WHEN RESUMING AND RESUMING INACTIVE WHEN SUSPENDING

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the access network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RC}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

FIG. 4 illustrates a high-level view of the 5G network architecture, consisting of a Next Generation RAN (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The NG RAN logical nodes shown in FIG. 4 (and described in 3GPP TR 38.801 v1.2.0) include a Central Unit (CU or gNB-CU) and one or more Distributed Units (DU or gNB-DU). CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.)

The NG, Xn-C and F1 items shown in FIG. 4 are logical interfaces. For NG-RAN, the NG and Xn-C interfaces for a split gNB (e.g., consisting of a gNB-CU and gNB-DUs) terminate in the gNB-CU. Likewise, for EN-DC, the S1-U and X2-C interfaces for a split gNB terminate in the gNB-CU. The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, a CU can host protocols such as RRC and PDCP, while a DU can host protocols such as RLC, MAC and PHY. Other variants of protocol distributions between CU and DU exist, such as hosting the RRC, PDCP and part of the RLC protocol in CU (e.g., Automatic Retransmission Request (ARQ) function), while hosting the remaining parts of the RLC protocol in the DU, together with MAC and PHY. In some exemplary embodiments, CU is assumed to host RRC and PDCP, where PDCP is assumed to handle both UP traffic and CP traffic. Nevertheless, other exemplary embodiments may utilize other protocol splits that by hosting certain protocols in CU and certain others in the DU. Exemplary embodiments can also locate centralized control plane protocols (e.g., PDCP-C and RRC) in a different CU with respect to the centralized user plane protocols (e.g., PDCP-U).

In LTE Rel-13 a mechanism was introduced for the UE to be suspended by the network in a suspended state similar to RRC_IDLE but with the difference that the UE stores the Access Stratum (AS) context or RRC context. This makes it possible to reduce the signaling when the UE becomes active again by resuming the RRC connection, thus eliminating the need to establish the RRC connection from scratch. Reducing the signaling can have several benefits, including reduced UE latency (e.g., for smart phones accessing the Internet) and reduced UE signaling, which further leads to reduced UE energy consumption, particularly for machine type communication (MTC) devices that send very little data (i.e., signaling being a primary consumer of energy).

The LTE Rel-13 solution is based on the UE sending a RRCConnectionResume-Request message to the network and in response receiving an RRCConnectionResume message form the network. The RRCConnectionResume is not encrypted, but is integrity protected.

As part of the 3GPP standardized work on 5G, it has been decided that NR should support an RRC_INACTIVE state with similar properties as the suspended state in LTE Rel-13. The RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

FIG. 5 is an exemplary state transition diagram showing possible transitions between RRC states in NR. The properties of the states shown in FIG. 5 are summarized as follows:

RRC_IDLE:
A UE specific DRX may be configured by upper layers;
UE controlled mobility based on network configuration;
The UE:
Monitors a Paging channel for CN paging using 5G-S-TMSI;
Performs neighbour cell measurements and cell (re-)selection;
Acquires system information.

RRC_INACTIVE:
A UE specific DRX may be configured by upper layers or by RRC layer;
UE controlled mobility based on network configuration;
The UE stores the AS context;
The UE:
Monitors a Paging channel for CN paging using 5G-S-TMSI and RAN paging using I-RNTI;
Performs neighboring cell measurements and cell (re-)selection;
Performs RAN-based notification area updates periodically and when moving outside the RAN-based notification area;
Acquires system information.

RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e. handover within NR and to/from E-UTRAN.
The UE:
Monitors a Paging channel;
Monitors control channels associated with the shared data channel to determine if data is scheduled for it;
Provides channel quality and feedback information;
Performs neighbouring cell measurements and measurement reporting;
Acquires system information.

In NR, it has been agreed that the transition from RRRC_CONNECTED to RRC_INACTIVE is a one-step procedure, using a single message called RRCRelease. As this is the same message the network uses to indicate the UE shall enter RRC_IDLE, an additional configuration parameter is included to indicate that the UE shall enter RRC_INACTIVE. Parameters to be used in RRC_INACTIVE procedures such as RAN paging, RNA updates, cell reselection priorities, etc., are also included.

FIG. 6 illustrates the RRC connection release procedure generally—it will be appreciated that the RRCRelease message shown therein may indicate that the UE is to transition to RRC_INACTIVE. Excerpted below is a portion of 3GPP TS 38.331 v15.0.0, describing the procedure.

---

5.3.8    RRC connection release
5.3.8.1    General
    [figure omitted]
The purpose of this procedure is:
    - to release the RRC connection, which includes the release of the established radio
      bearers as well as all radio resources; or
    - to suspend the RRC connection, which includes the suspension of the established
      radio bearers.
5.3.8.2    Initiation
The network initiates the RRC connection release procedure to a UE in
RRC_CONNECTED or initiates the RRC suspend procedure to an UE in
RRC_INACTIVE trying to resume the RRC connection or in RRC_CONNECTED. The
procedure can also be used to release and redirect a UE to another frequency.
5.3.8.3    Reception of the RRCRelease by the UE
The UE shall:
    1>delay the following actions defined in this sub-clause X ms from the moment the
      RRCRelease message was received or optionally when lower layers indicate that
      the receipt of the RRCRelease message has been successfully acknowledged,
      whichever is earlier;
    Editor's Note: How to set the value of X (whether it is configurable, or fixed to 60 ms
      as in LTE, etc.).
    1>if the RRCRelease message includes the cellReselectionPriorities:
      2>store the cell reselection priority information provided by the
        cellReselectionPriorities;
      2>if the t320 is included:
        3>start timer T320, with the timer value set according to the value of t320;
    1>else:
      2>apply the cell reselection priority information broadcast in the system
        information;
    Editor's Note: FFS Whether RRCRelease supports a mechanim equivalent to
      loadBalancingTAURequired.
    1>if deprioritisationReq is included:
      2>start or restart timer T325 with the timer value set to the deprioritisationTimer
        signalled;
      2>store the deprioritisationReq until T325 expiry;
    1>if the RRCRelease includes suspendConfig:
      2>store the following information provided by the network: resumeIdentity,
        nextHopChainingCount, ran-PagingCycle and ran-NotificationAreainfo;

-continued

```
            2>re-establish RLC entities for all SRBs and DRBs;
            2>reset MAC;
            2>if the RRCRelease message with suspendConfig was received in response to an
                RRCResumeRequest:
                3>stop the timer T314 if running;
                3>FFS Update of parameters upon direct transition from RRC_INACTIVE to
                    RRC_INACTIVE (e.g. C-RNTI, cellIdentity, security context, etc.);
            2>else:
                3>store the UE AS Context including the current RRC configuration, the
                    current security context, the PDCP state including ROHC state, SDAP
                    configuration, C-RNTI used in the source PCell, the cellIdentity and the
                    physical cell identity of the source PCell;
                2>suspend all SRB(s) and DRB(s), except SRB0;
                2>start timer T380, with the timer value set to periodic-RNAU-timer;
                2>indicate the suspension of the RRC connection to upper layers;
                2>configure lower layers to suspend integrity protection and ciphering;
                2>enter RRC_INACTIVE and perform procedures as specified in TS 38.304
                    [21]
1>          else
            2>perform the actions upon going to RRC_IDLE as specified in 5.3.11;
Editor's Note: FFS Whether there needs to be different release causes and actions
associated.
                ...
```

Some of the parameters can be called inactive state parameters, as they are exclusive to the case when the UE receives in the Release message a suspend configuration, enters RRC_INACTIVE and apply these parameters. Other parameters are common to idle and inactive UEs. This is shown in the following ASN.1 message structure in the current draft of the RRC specifications.

RRCRelease
The RRCRelease message is used to command the release of an RRC connection or the suspension of the RRC connection.
Signalling radio bearer: SRB1
RLC-SAP: AM
Logical channel: DCCH
Direction: Network to UE
RRCRelease message

```
-- ASN1START
-- TAG-RRCRELEASE-START
RRCRelease ::=              SEQUENCE {
    rrc-TransactionIdentifier           RRC-TransactionIdentifier,
    criticalExtensions                  CHOICE {
        c1                              CHOICE {
            rrcRelease                  RRCRelease-IEs,
            spare3 NULL, spare2 NULL, spare1 NULL
        },
        criticalExtensionsFuture        SEQUENCE { }
    }
}
RRCRelease-IEs ::=          SEQUENCE {
    redirectedCarrierInfo               RedirectedCarrierInfo
        OPTIONAL, -- Need N
    cellReselectionPriorities           CellReselectionPriorities
                OPTIONAL,   -- Need M
    suspendConfig                       SuspendConfig
        OPTIONAL, -- Need N
    deprioritisationReq                 SEQUENCE {
        deprioritisationType            ENUMERATED {frequency, nr},
        deprioritisationTimer           ENUMERATED {min5, min10,
min15, min30}
    }
    lateNonCriticalExtension            OCTETSTRING
                                        OPTIONAL,
    nonCriticalExtension                SEQUENCE{ }
                                        OPTIONAL
}
RedirectedCarrierInfo ::=               CHOICE {
    nr                                  ARFCN-ValueNR,
    eutra                               ARFCN-ValueEUTRA,
    ...
}
```

-continued

```
                        RRCRelease
    The RRCRelease message is used to command the release of an
        RRC connection or the suspension of the RRC connection.
                    Signalling radio bearer: SRB1
                           RLC-SAP: AM
                       Logical channel: DCCH
                       Direction: Network to UE
                         RRCRelease message SuspendConfig ::= SEQUENCE {
    resumeIdentity              I-RNTI-Value,
    pagingCycle                 PagingCycle,
    ran-NotificationAreaInfo        RAN-NotificationAreaInfo,
    periodic-RNAU-timer         ENUMERATED {ffsValue},
    nextHopChainingCount        NextHopChainingCount
}
CellReselectionPriorities ::=   SEQUENCE {
    freqPriorityListEUTRA           FreqPriorityListEUTRA
    OPTIONAL,     -- Need M
    freqPriorityListNR              FreqPriorityListNR
    OPTIONAL,     -- Need M
    t320                        ENUMERATED {
                                    min5, min10, min20, min30, min60,
min120, min180,
                                    spare1}         OPTIONAL,
        -- Need R
    ...
}
-- FFS Maximum number of frequency in priority list
FreqPriorityListEUTRA ::=       SEQUENCE (SIZE (1..ffsValue)) OF
FreqPriorityEUTRA
FreqPriorityListNR ::=          SEQUENCE (SIZE (1..ffsValue)) OF
FreqPriorityNR
FreqPriorityEUTRA ::=           SEQUENCE {
    carrierFreq                 ARFCN-ValueEUTRA,
    cellReselectionPriority         CellReselectionPriority
}
FreqPriorityNR ::=              SEQUENCE {
    carrierFreq                 ARFCN-ValueNR,
    cellReselectionPriority         CellReselectionPriority
}
RAN-NotificationAreaInfo        ::= CHOICE {
    cellList                PLMN-RAN-AreaCellList,
    ran-AreaConfigList          PLMN-RAN-AreaConfigListRAN
}
PLMN-RAN-AreaCellList      ::=          SEQUENCE (SIZE (1..
maxPLMNIdentities)) OF PLMN-RAN-AreaCell
-- Sum of cells from all PLMNs does not exceed 32
PLMN-RAN-AreaCell ::=      SEQUENCE {
    plmn-Identity               PLMN-Identity
    ran-AreaCells               SEQUENCE (SIZE (1..32)) OFCellIdentity
}
PLMN-RAN-AreaConfigList   ::=          SEQUENCE (SIZE
(1..maxPLMNIdentities)) OF PLMN-RAN-AreaConfig
PLMN-RAN-AreaConfig ::=         SEQUENCE {
    plmn-Identity               PLMN-Identity,
    ran-Area                    SEQUENCE (SIZE (1..16)) OFRAN-AreaConfig
}
RAN-AreaConfig ::=         SEQUENCE {
    trackingAreaCode            TrackingAreaCode,
--Sum of RAN-AreaCodes all FLMNs does not exceed 32
    ran-AreaCodeList            SEQUENCE (SIZE. (1..32)) OFRAN-AreaCode
        OPTIONAL
}
RAN-AreaCode::=                 BIT STRING (SIZE (6))
TrackingAreaCode ::= INTEGER
-- TAG-RRCRELEASE-STOP
-- ASN1STOP
```

SUMMARY

According to the conventional signaling structure, when the UE enters RRC_INACTIVE for the first time, the network is mandated to provide the following parameters (as they are defined as mandatory within the suspend configuration):

Resume Identity (or any UE/node identifier enabling network to identify the UE AS context and fetch it), e.g., resumeID in EUTRA or I-RNTI in NR;

Paging cycle or any RAN paging related configuration;

RNA configuration such as list of cells, list of Tracking Area Identifiers, RANACs;

Periodic RNA configuration such as the RNA update timer;

Next hop chaining count enabling UE to refresh the keys at subsequent resume requests;

Also, the whole suspend configuration has been defined in the specification as a need N type defined in the specification as follows:

Need N—No action (one-shot configuration that is not maintained); Used for (configuration) fields that are not stored and whose presence causes a one-time action by the UE. Upon receiving message with the field absent, the UE takes no action.

Consequently, every time the network wants to suspend the UE, the network is mandated to include all these parameters in the suspend configuration.

A first problem addressed by several embodiments of the presently disclosed techniques is that the suspend procedure can be quite frequent. It is envisioned that in NR, inactive state should be the main state, for battery consumption optimization, so that as soon as the network knows there is no more data transaction with the UE, network wants to move the UE to inactive. This can occur after short data sessions, i.e., quite frequently UEs will be moving between RRC_INACTIVE and RRC_CONNECTED and suspend procedure is invoked. In addition to this, the procedure will occur even more often, since NR has defined a new inactive procedure not existing in LTE called RAN Area Update which can be executed in two steps every time a periodic RNAU timer expires and every time the UE enters a cell not belonging to its configured RNAU. Having a non-optimized signalling leads to an overall higher overhead (as procedure is executed very often).

Second, most of the time UEs are likely to be static, i.e., performing subsequent RRC_CONNECTED from/to RRC_INACTIVE transitions in the same cell or neighborhood. Hence, most likely, many of the inactive parameters will have to be the same anyway, i.e., network provides again and again the same parameters to the UE although the UE already has the same parameters available.

Third, there have been discussions in 3GPP to optimize periodic RNAUs by enabling network to avoid context relocation. That means that in theory there is no need to change some of these parameters at all. However, the current structure enforces the network to repeat them again and again. Further, the UE needs to delete and store the same parameters again and again.

Fourth, there have been discussions in 3GPP to introduce early data transmissions in NR (currently being introduced in LTE). In that case, data is transmitted multiplexed with an RRC Resume Request and, network can response with a Release message suspending the UE back to RRC_INACTIVE.

Some embodiments of the presently disclosed techniques provide a signaling optimization, since the network does not need to signal same parameters every time the UE is suspended. By keeping the inactive configuration while the UE is connected it is, for instance, possible to page the UE from data, send the data to UE and re-suspend the UE without updating the inactive configuration (e.g. RNA area, DRX parameters). This is not feasible in prior solutions.

Exemplary embodiments of the present disclosure include methods and/or procedures for handling transitions from RRC connected state to an RRC inactive state. According to some embodiments, a method in a wireless device operating in a wireless network includes receiving, from the wireless network, a message indicating either that the wireless device is to enter the RRC inactive state or that the wireless device is to remain in the RRC inactive state. The method also includes, responsive to the message, using, for inactive state operation, at least one previously stored inactive state parameter corresponding to a parameter omitted from the message.

According to some embodiments, a method, in a wireless device operating in a wireless network, for handling transitions from RRC connected state to an RRC inactive state, includes autonomously entering the RRC inactive state and using, for inactive state operation, at least one previously stored inactive state parameter corresponding to a parameter omitted from the message.

According to some embodiments, a method, in a wireless device operating in a wireless network, for handling transitions from RRC connected state to an RRC inactive state, includes transitioning from the RRC inactive state to the RRC connected state and storing at least one inactive state parameter for use when subsequently re-entering the RRC inactive state.

Other exemplary embodiments include radio nodes in the cellular network (e.g., radio nodes (e.g., base stations, low-power nodes, wireless devices, user equipment, etc.) configurable to perform operations corresponding to the exemplary methods and/or procedures described above. Other exemplary embodiments include non-transitory, computer-readable media storing program instructions that, when executed by at least one processor, configure such radio nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1:
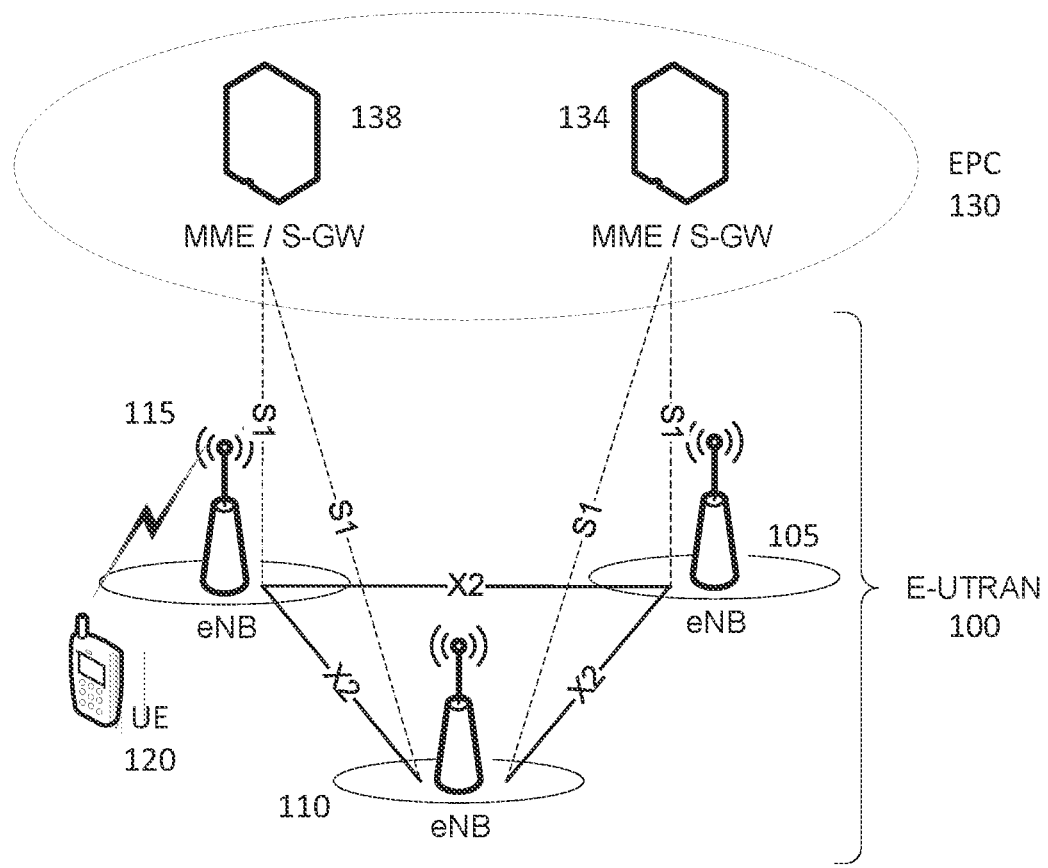
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR concepts) beams may be used instead of cells and, as such, concepts described herein apply equally to both cells and beams.

Various exemplary embodiments are described herein as methods, procedures, and/or operations performed by a UE in RRC_INACTIVE state in an NR network. These embodiments are used for the purpose of illustration only, without limitation. For example, principles of these embodiments are equally applicable to other configurations, scenarios, and/or network types included, but not limited to:

UEs in RRC_INACTIVE state in LTE networks;

UE inter-RAT procedures in RRC_INACTIVE, mainly between LTE and NR RANs connected to the same CN (5G Core Network). In these scenarios, the periodic RNA update timer, T380, is defined as an inter-RAT timer (i.e., it keeps running even when UE is changing RAT). If T380 expires when the UE is in the other RAT, the UE will perform periodic RNA update in that RAT. These inter-RAT scenarios include:

UE in LTE RRC_CONNECTED is suspended to LTE RRC_INACTIVE, starts T380, performs mobility management and camps on an NR cell (i.e. becomes RRC_INACTIVE in NR). While in NR, T380 expires and UE tries to perform an RNA update (with a resume request) in NR. Network can respond with an RRCReject.

UE in NR RRC_CONNECTED is suspended to NR RRC_INACTIVE, starts T380, performs mobility management, and camps on an LTE cell (i.e. becomes RRC_INACTIVE in LTE). While in LTE, T380 expires and UE tries to perform an RNA update (with a resume request) in NR. Network can respond with an RRCReject.

Embodiments disclosed herein include methods, at a wireless device, the methods comprising one or more of the following:

(1) Resuming an inactive procedure upon suspending the RRC connection where indication to enter RRC_INACTIVE does not contain an inactive parameter (1.1) Upon receiving an instruction from the network to enter in RRC_INACTIVE where that instruction does not contain an inactive state parameter (parInactivex) associated to a specific inactive state procedure, using an existing stored inactive parameter (parInactivex) to execute the procedure when entering RRC_INACTIVE; Or (1.2) Upon receiving an instruction from the network to remain in RRC_INACTIVE where that instruction does not contain an inactive state parameter (parInactivex) associated to a specific inactive state procedure, using an existing stored inactive parameter (parInactivex) to execute the procedure when entering RRC_INACTIVE;

(1.3) Upon autonomously moving to RRC_INACTIVE, for example by the expiry of a timer, using an existing stored inactive parameter (parInactivex) to execute the procedure when entering RRC_INACTIVE;

(2) Suspending an inactive procedure upon resuming the RRC connection (2.1) Upon resuming an RRC connection and entering RRC_CONNECTED, suspend the inactive procedure, keep stored inactive parameter (parInactivex);

(3) Resuming an inactive procedure upon suspending the RRC connection where indication to enter RRC_INACTIVE contains an inactive parameter (3.1) Upon receiving an instruction from the network to enter in RRC_INACTIVE where that instruction contains an inactive state parameter (parInactivex) associated to a specific inactive state procedure, overrides the existing stored inactive parameter (parInactivex) value, store the new value and execute the procedure when entering RRC_INACTIVE; or (3.2) Upon receiving an instruction from the network to remain in RRC_INACTIVE where that instruction contains an inactive state parameter (parInactivex) associated to a specific inactive state procedure, overrides the existing stored inactive parameter (parInactivex) value, store the new value and execute the procedure when entering RRC_INACTIVE; Or (3.3) Upon autonomously moving to RRC_INACTIVE, for example by the expiry of a timer, overrides the existing stored inactive parameter (parInactivex) value with a default value and store the new default value and execute the procedure when entering RRC_INACTIVE;

The instruction from the network described in (1) can be an RRC Release message with a suspend configuration or any other message sending the UE to RRC_INACTIVE e.g. an RRC suspend message. That can be sent in response to an RRC Resume Request when the UE tries to perform a mobility RNA update or a periodic RNA update. As described, it can also be any autonomous UE action defined moving the UE back to RRC_INACTIVE e.g. a timer-based solution where upon the expiry of the timer the UE moves from RRC_CONNNECTED to RRC_INACTIVE.

Each inactive parameter described in (1) as parInactivex can be any of the following:

Resume Identity (or any UE/node identifier enabling network to identify the UE AS context and fetch it), e.g., resumeID in EUTRA or I-RNTI in NR;

Paging cycle or any RAN paging related configuration;

RNA configuration such as list of cells, list of Tracking Area Identifiers, RANACs;

Periodic RNA configuration such as the RNA update timer;

Next hop chaining count enabling UE to refresh the keys at subsequent resume requests;

Configuration related to early data transmission;

Wait time to indicate the UE shall not try to resume or connected to that cell until the timer expires;

Cell reselection priorities;

Frequency redirection information;

Cell quality derivation parameters;

Any measurement related configuration to be used in RRC_INACTIVE;

In some embodiments, the UE may receive in the indication suspending the UE from the network containing a full configuration indication. Upon receiving that indication for full configuration, the UE releases previously stored inactive configuration and replaces it with newly provided parameters.

In a variant, the UE may receive in the indication suspending the UE from the network containing a full configuration indication which can be per inactive parameter or subset of parameters. Upon receiving that indication for full configuration, the UE releases an indicated previously stored inactive parameter and replaces it with newly provided parameter.

In some embodiments, the resume message contains an instruction to the UE so that the UE releases the stored inactive state parameters.

Some of the techniques described above may be implemented in 3GPP specifications as follows:

RRCRelease
The RRCRelease message is used to command the release of an
RRC connection or the suspension of the RRC connection.
Signalling radio bearer: SRB1
RLC-SAP: AM
Logical channel: DCCH
Direction: Network to UE
RRCRelease message

```
-- ASN1START
-- TAG-RRCRELEASE-START
RRCRelease ::=        SEQUENCE {
    rrc-TransactionIdentifier         RRC-TransactionIdentifier,
    criticalExtensions                CHOICE {
        c1                                CHOICE {
            rrcRelease                        RRCRelease-IEs,
            spare3 NULL, spare2 NULL, spare1 NULL
        },
        criticalExtensionsFuture          SEQUENCE { }
    }
}
RRCRelease-IEs ::=  SEQUENCE {
    redirectedCarrierInfo             RedirectedCarrierInfo           OPTIONAL,  -- Need N
    cellReselectionPriorities         CellReselectionPriorities       OPTIONAL,  -- Need M
    suspendConfig                     SuspendConfig                   OPTIONAL,  -- Need N
    deprioritisationReq               SEQUENCE {
        deprioritisationType              ENUMERATED {frequency, nr},
        deprioritisationTimer             ENUMERATED {min5, min10, min15, min30}
    }
    lateNonCriticalExtension          OCTETSTRING
                            OPTIONAL,
    nonCriticalExtension              SEQUENCE{ }
                            OPTIONAL
}
```

| RRCRelease |
|---|
| The RRCRelease message is used to command the release of an RRC connection or the suspension of the RRC connection.<br>Signalling radio bearer: SRB1<br>RLC-SAP: AM<br>Logical channel: DCCH<br>Direction: Network to UE<br>RRCRelease message |

```
RedirectedCarrierInfo ::=       CHOICE {
    nr                              ARFCN-ValueNR,
    eutra                           ARFCN-ValueEUTRA,
    ...
}
SuspendConfig ::= SEQUENCE {
    resumeIdentity                  I-RNTI-Value                    OPTIONAL,
    pagingCycle                     PagingCycle                     OPTIONAL,
    ran-NotificationAreaInfo        RAN-NotificationAreaInfo        OPTIONAL,
    periodic-RNAU-timer             ENUMERATED {ffsValue}           OPTIONAL,
    nextHopChainingCount            NextHopChainingCount            OPTIONAL
}
CellReselectionPriorities ::=   SEQUENCE {
    freqPriorityListEUTRA           FreqPriorityListEUTRA           OPTIONAL,   - - Need M
    freqPriorityListNR              FreqPriorityListNR              OPTIONAL,   - - Need M
    t320                            ENUMERATED {
                                        min5, min10, min20, min30, min60, min120, min180,
                                        spare1}                     OPTIONAL,   - - Need R
    ...
}
-- FFS Maximum number of frequency in priority list
FreqPriorityListEUTRA ::=       SEQUENCE (SIZE (1..ffsValue)) OF FreqPriorityEUTRA
FreqPriorityListNR ::=          SEQUENCE (SIZE (1..ffsValue)) OF FreqPriorityNR
FreqPriorityEUTRA ::=           SEQUENCE {
    carrierFreq                     ARFCN-ValueEUTRA,
    cellReselectionPriority         CellReselectionPriority
}
FreqPriorityNR ::=              SEQUENCE {
    carrierFreq                     ARFCN-ValueNR,
    cellReselectionPriority         CellReselectionPriority
}
RAN-NotificationAreaInfo        ::= CHOICE {
    cellList                        PLMN-RAN-AreaCellList,
    ran-AreaConfigList              PLMN-RAN-AreaConfigListRAN
}
PLMN-RAN-AreaCellList =         SEQUENCE (SIZE (1..maxPLMNIdentities)) OF PLMN-RAN-AreaCell
-- Sum of cells from all PLMNs does not exceed 32
PLMN-RAN-AreaCell ::= SEQUENCE {
    plmn-Identity                   PLMN-Identity
    ran-AreaCells                   SEQUENCE (SIZE (1..32)) OF CellIdentity
}
PLMN-RAN-AreaConfigList ::=     SEQUENCE (SIZE (1..maxPLMNIdentities)) OF PLMN-RAN-AreaConfig
PLMN-RAN-AreaConfig ::= SEQUENCE {
    plmn-Identity                   PLMN-Identity,
    ran-Area                        SEQUENCE (SIZE (1..16)) OF RAN-AreaConfig
}
RAN-AreaConfig ::= SEQUENCE {
    trackingAreaCode                TrackingAreaCode,
--Sum of RAN-AreaCodes all PLMNs does not exceed 32
    ran-AreaCodeList                SEQUENCE (SIZE (1..32)) OF RAN-AreaCode OPTIONAL
}
RAN-AreaCode::=                 BIT STRING (SIZE (6))
TrackingAreaCode ::= INTEGER
-- TAG-RRCRELEASE-STOP
-- ASN1STOP
```

5.3.8 RRC connection release
5.3.8.1    General
       [figure omitted]

-continued

The purpose of this procedure is:
- to release the RRC connection, which includes the release of the established radio bearers as well as all radio resources; or
- to suspend the RRC connection, which includes the suspension of the established radio bearers.

5.3.8.2 Initiation
The network initiates the RRC connection release procedure to a UE in RRC_CONNECTED or initiates the RRC suspend procedure to an UE in RRC_INACTIVE trying to resume the RRC connection or in RRC_CONNECTED. The procedure can also be used to release and redirect a UE to another frequency.

1. 5.3.8.3  Reception of the RRCRelease by the UE
The UE shall:
    1>delay the following actions defined in this sub-clause X ms from the moment the RRCRelease message was received or optionally when lower layers indicate that the receipt of the RRCRelease message has been successfully acknowledged, whichever is earlier;
...
    1>if the RRCRelease message includes the cellReselectionPriorities:
        2>store the cell reselection priority information provided by the cellReselectionPriorities;
        2>if the t320 is included:
            3>start timer T320, with the timer value set according to the value of t320;
    1>else:
        2>apply the cell reselection priority information broadcast in the system information;
...
    1>if deprioritisationReq is included:
        2>start or restart timer T325 with the timer value set to the deprioritisationTimer signalled;
        2>store the deprioritisationReq until T325 expiry;
    1>if the RRCRelease includes suspendConfig:
        2>if the suspendConfig includes resumeIdentity;
            3>delete any stored resumeIdentity and store the new value provided in suspendConfig;
        2>if the suspendConfig includes nextHopChainingCount;
            3>delete any stored nextHopChaining Count and store the new value provided in suspendConfig;
        2>if the suspendConfig includes ran-PagingCycle;
            3>delete any stored ran-Paging Cycle and store the new value provided in suspendConfig;
        2>if the suspendConfig includes ran-NotificationAreaInfo;
            3>delete any stored ran-NotificationAreaInfo and store the new value provided in suspendConfig;
        2>re-establish RLC entities for all SRBs and DRBs;
        2>reset MAC;
        2>if the RRCRelease message with suspendConfig was received in response to an RRCResumeRequest:
            3>stop the timer T314 if running;
            3>FFS Update of parameters upon direct transition from RRC_INACTIVE to RRC_INACTIVE (e.g. C-RNTI, cellIdentity, security context, etc.);
        2>else:
            3>store the UE AS Context including the current RRC configuration, the current security context, the PDCP state including ROHC state, SDAP configuration, C-RNTI used in the source PCell, the cellIdentity and the physical cell identity of the source PCell;
        2>suspend all SRB(s) and DRB(s), except SRB0;
        2>start timer T380, with the timer value set to periodic-RNAU-timer;
        2>indicate the suspension of the RRC connection to upper layers;
        2>configure lower layers to suspend integrity protection and ciphering;
        2>enter RRC_INACTIVE and perform procedures as specified in TS 38.304 [21]
    1>else
        2>perform the actions upon going to RRC_IDLE as specified in 5.3.11;
...

5.3.13.4  Reception of the RRCResume by the UE
The UE shall:
  1>stop timer T314;
  1>restore the PDCP state, reset COUNT value and re-establish PDCP entities for SRB2 and all DRBs;
  1>restore the SDAP state and re-establish SDAP;
  1>if drb-ContinueROHC is included:
      2>indicate to lower layers that stored UE AS context is used and that drb-ContinueROHC is configured;

2>continue the header compression protocol context for the DRBs configured with the header compression protocol;
1>else:
2>indicate to lower layers that stored UE AS context is used;
2>reset the header compression protocol context for the DRBs configured with the header compression protocol;
1>store inactive state parameters such as resumeIdentity, ran-PagingCycle, ran-NotificationAreaInfo,
1>discard the stored UE AS context including nextHopChainingCount;
1>suspend inactive state configuration;
1>if the RRCResume includes the masterCellGroup:
2>perform the cell group configuration for the received masterCellGroup according to 5.3.5.5;
...
1>if the RRCResume includes the radioBearerConfig:
2>perform the radio bearer configuration according to 5.3.5.6;
...
1>resume SRB2 and all DRBs;
1>if stored, discard the cell reselection priority information provided by the cellReselectionPriorities or inherited from another RAT;
1>if the RRCResume message includes the measConfig:
2>perform the measurement configuration procedure as specified in 5.5.2;
1>resume measurements if suspended;
...
1>enter RRC_CONNECTED;
1>indicate to upper layers that the suspended RRC connection has been resumed;
...
1>stop the cell re-selection procedure;
1>consider the current cell to be the PCell;
1>set the content of the of RRCResumeCompletemessage as follows:
2>if the upper layer provides NAS PDU include and set the dedicatedInfoNAS to include the information received from upper layers;
1>submit the RRCResumeComplete message to lower layers for transmission;
1>the procedure ends.

Figure 7:
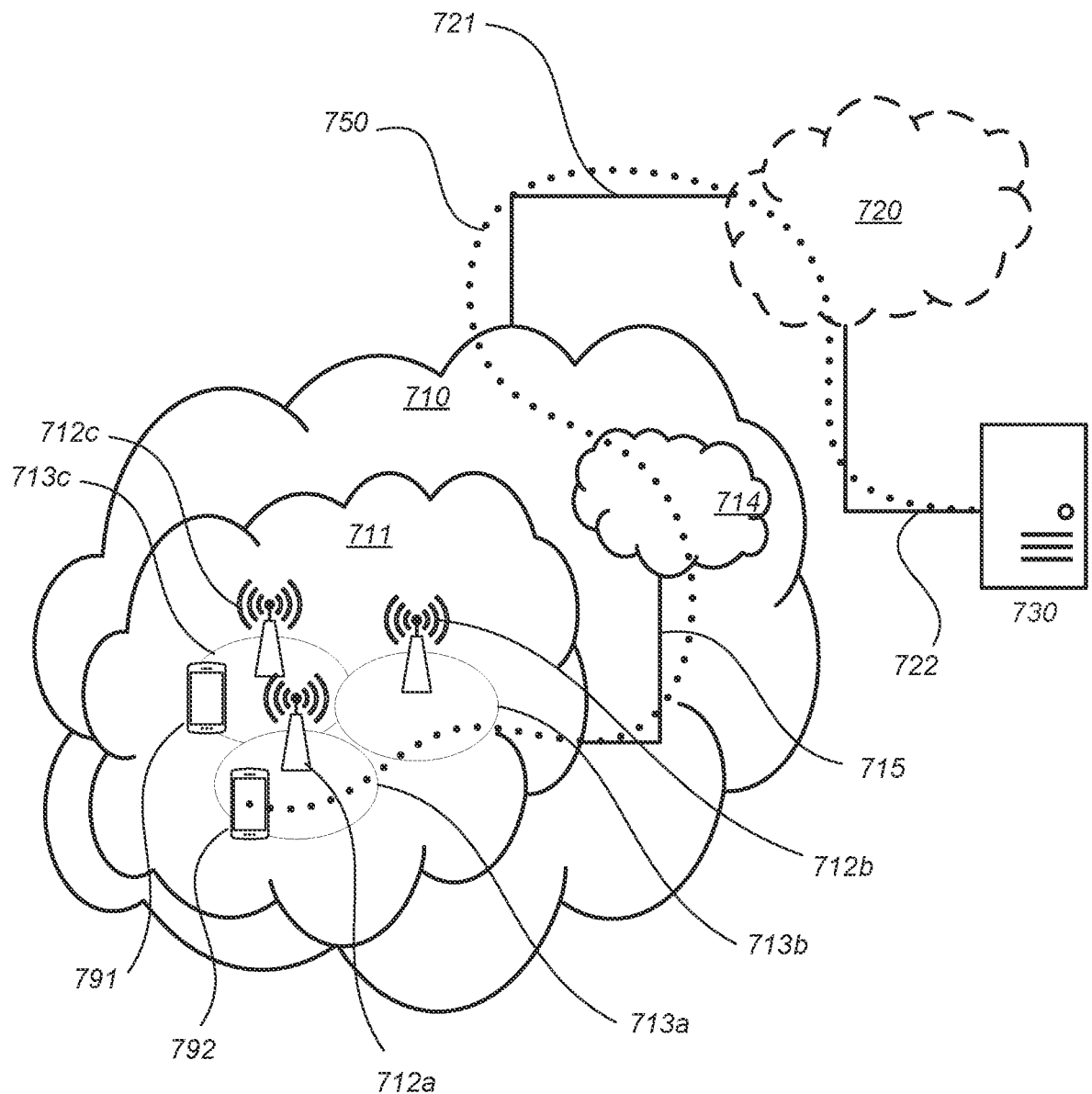
FIG. 7 illustrates an example communication system, according to some embodiments.

FIG. 7, in accordance with various embodiments, shows a communication system that includes a telecommunication network 710, such as a 3GPP-type cellular network, which comprises an access network 711, such as an gNB-RAN, and a core network 714 (e.g., 5GC). The access network 711 comprises a plurality of base stations 712a, 712b, 712c, such as gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
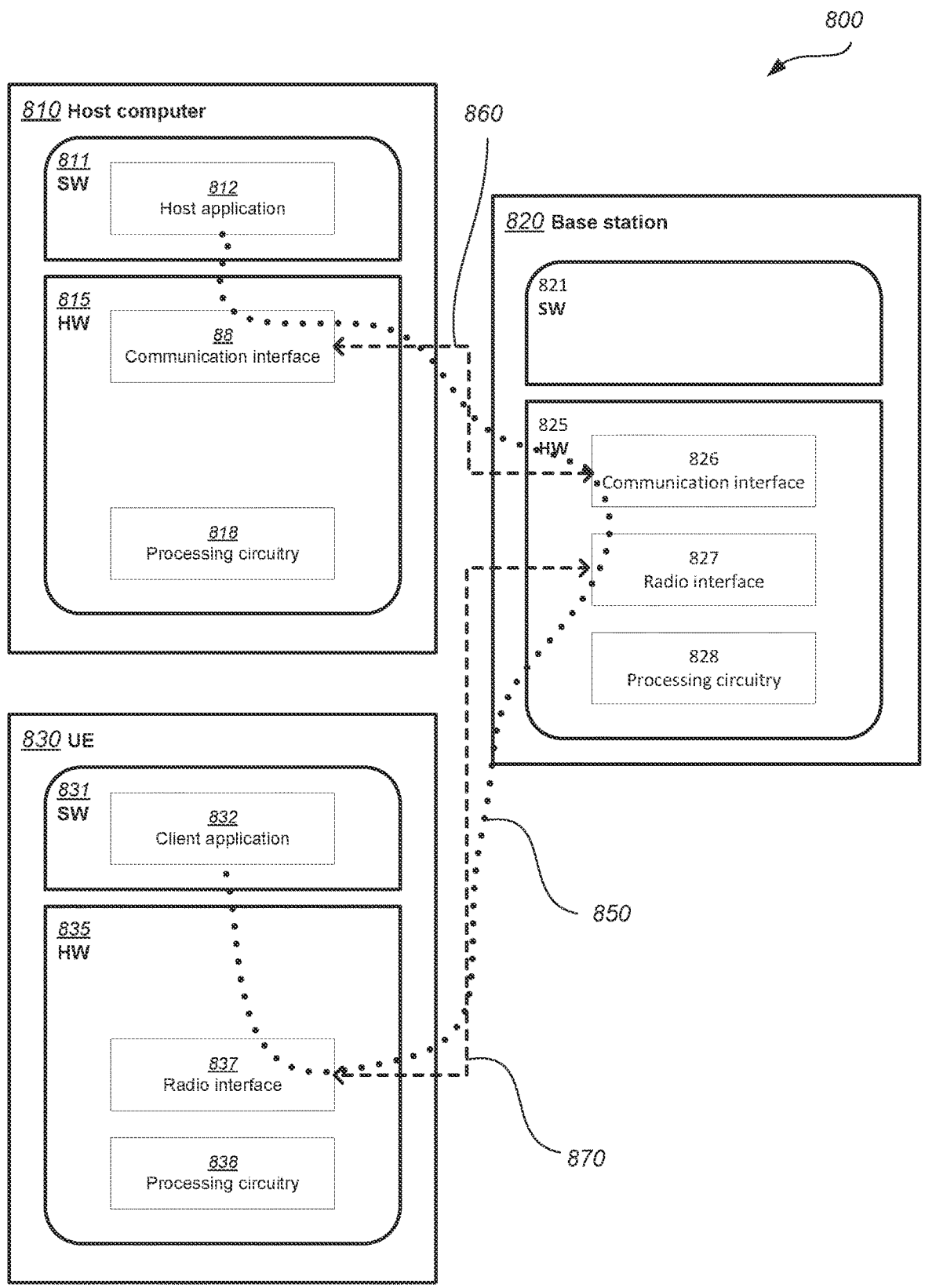
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the presently disclosed techniques provide a signaling optimization, since the network does not need to signal same parameters every time the UE is suspended. By keeping the inactive configuration while the UE is connected it is, for instance, possible to page the UE from data, send the data to UE and re-suspend the UE without updating the inactive configuration (e.g. RNA area, DRX parameters). These embodiments will result in improved performance, such as better and/or more consistent throughput, and/or reduced delays, for users of the RAN.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
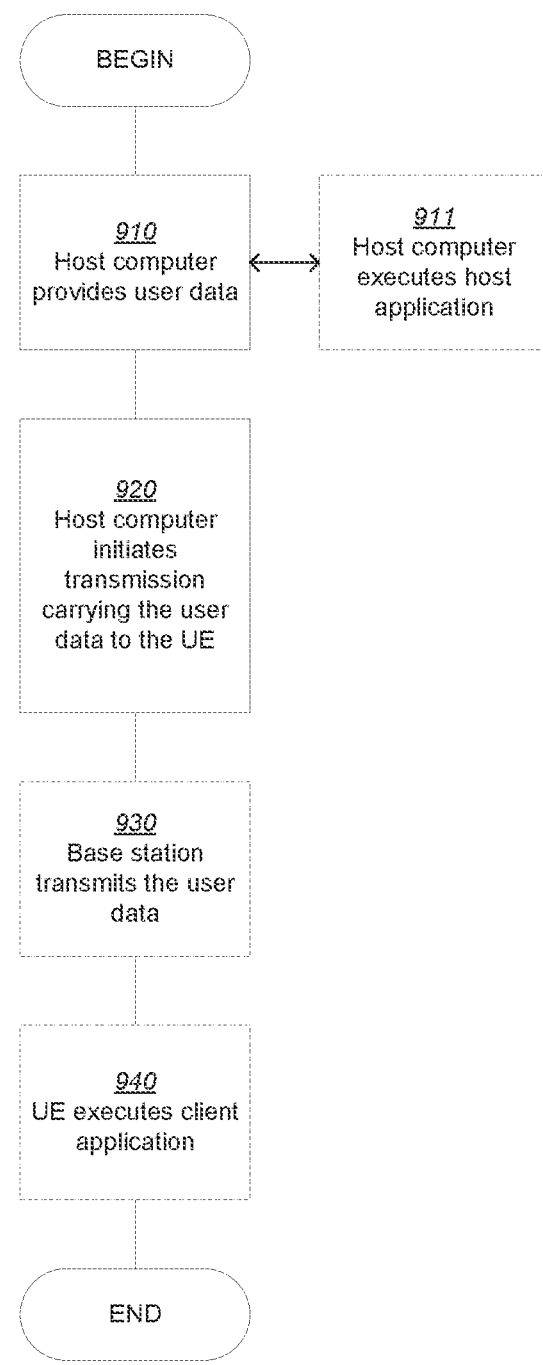
FIG. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
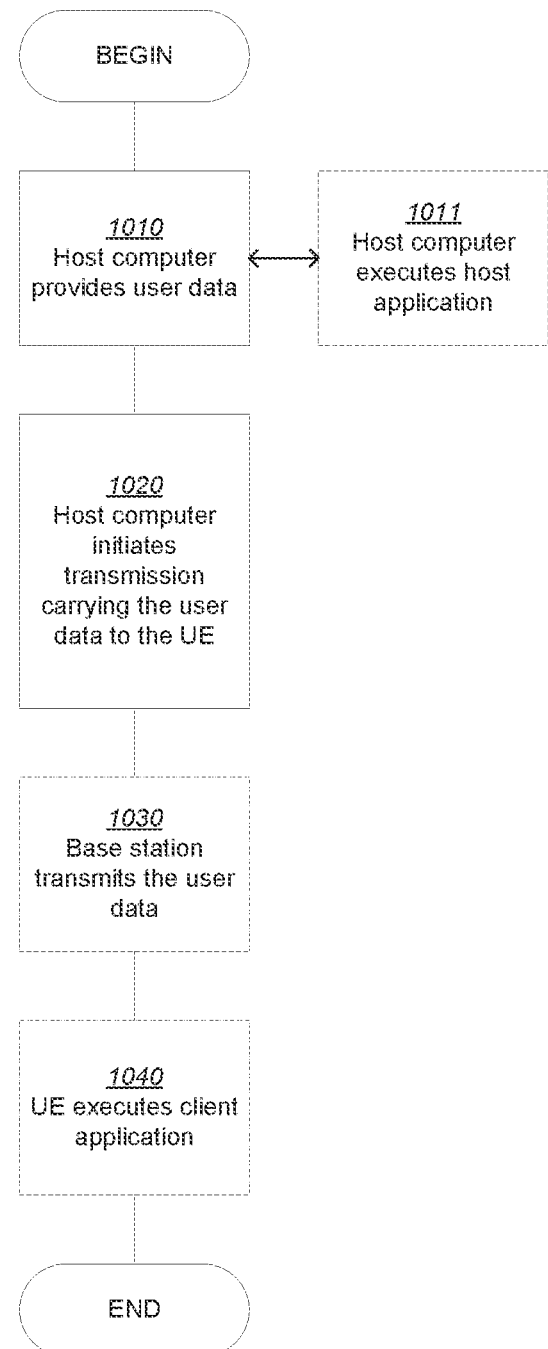

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figure 11:
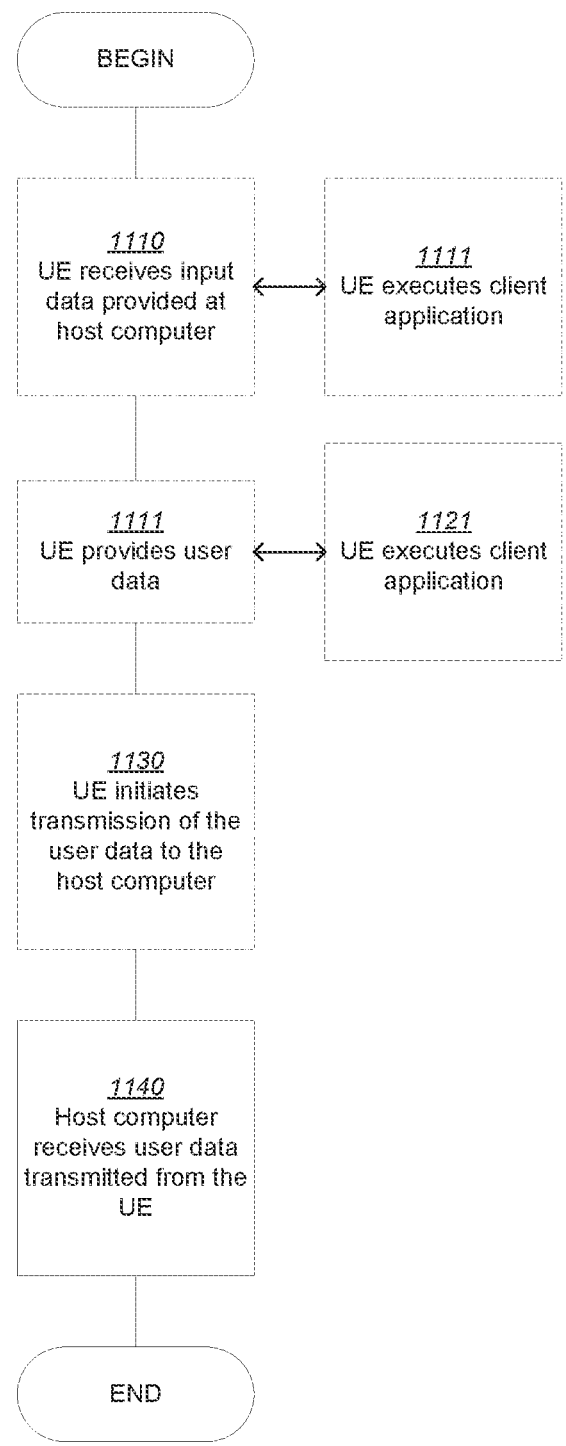

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

Figure 12:
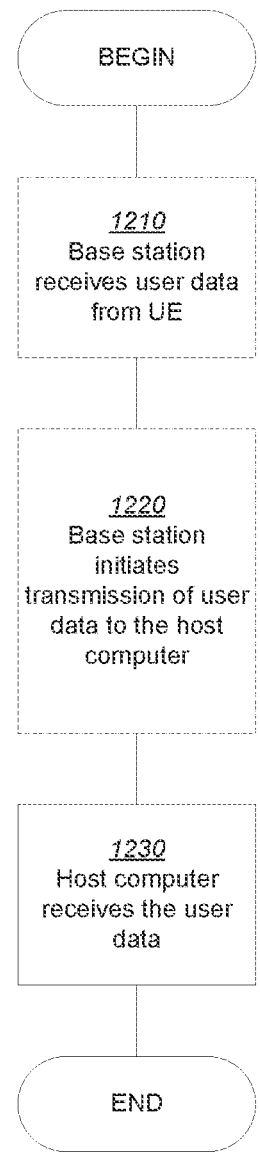

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

Figure 13:
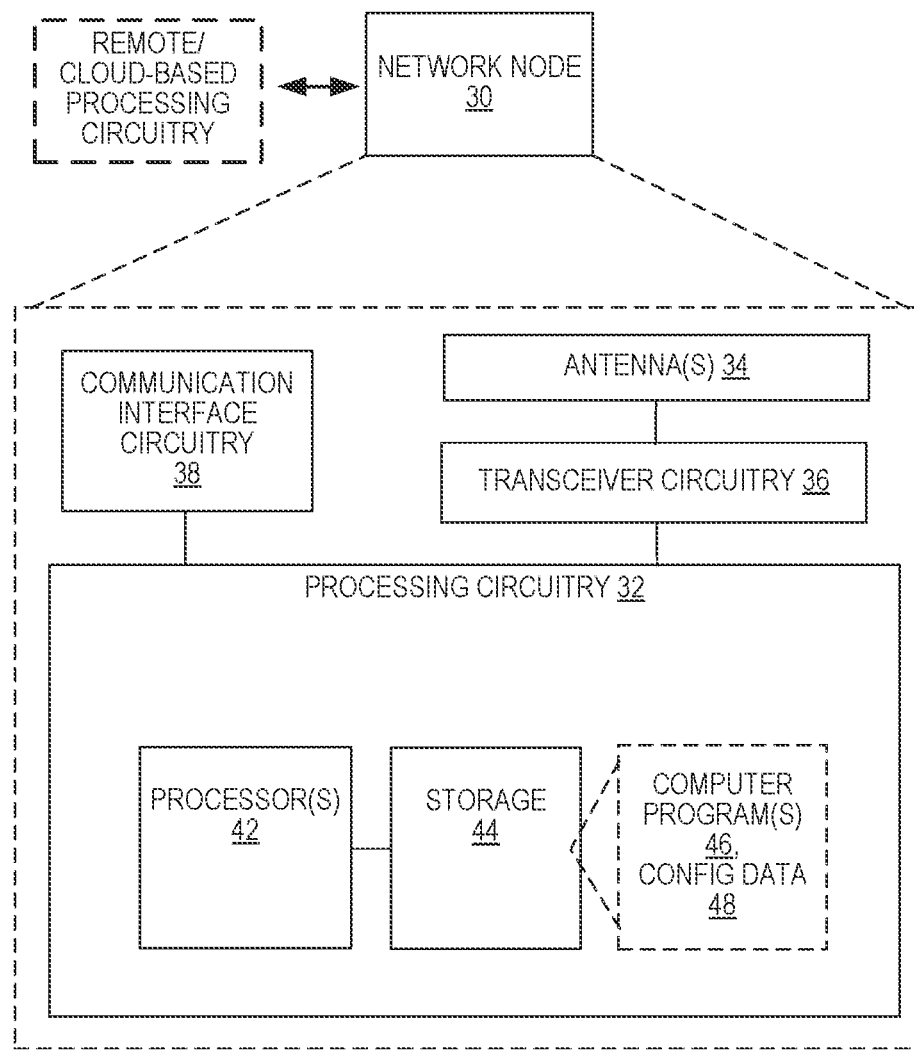
FIG. 13 is a block diagram illustrating an example network node, according to some embodiments.

FIG. 13 is a block diagram illustrating an example network node 30, which may be configured to operate as a base station. The network node 30 may be one of multiple network nodes in a cloud-based system that carry out the described techniques. The network node 30 may be, for example, an eNB or a 5G gNB. The network node 30 provides an air interface to a wireless device, e.g., 5G air interface for downlink transmission and uplink reception, which is implemented via antennas 34 and transceiver circuitry 36. The transceiver circuitry 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE, LTE-Advanced and 5G. The network node 30 also include communication interface circuitry 38 for communicating with nodes in the core network, other peer radio nodes, and/or other types of nodes in the network.

The network node 30 also includes one or more processing circuits 32 that are operatively associated with and configured to control the communication interface circuitry 38 and/or the transceiver circuitry 36. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuitry 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processing circuitry 32 of one or more network nodes 30 connected to a wireless network is configured to perform operations for handling transitions from RRC connected state to an RRC inactive state with respect to the wireless network in the techniques described herein.

Figure 14:
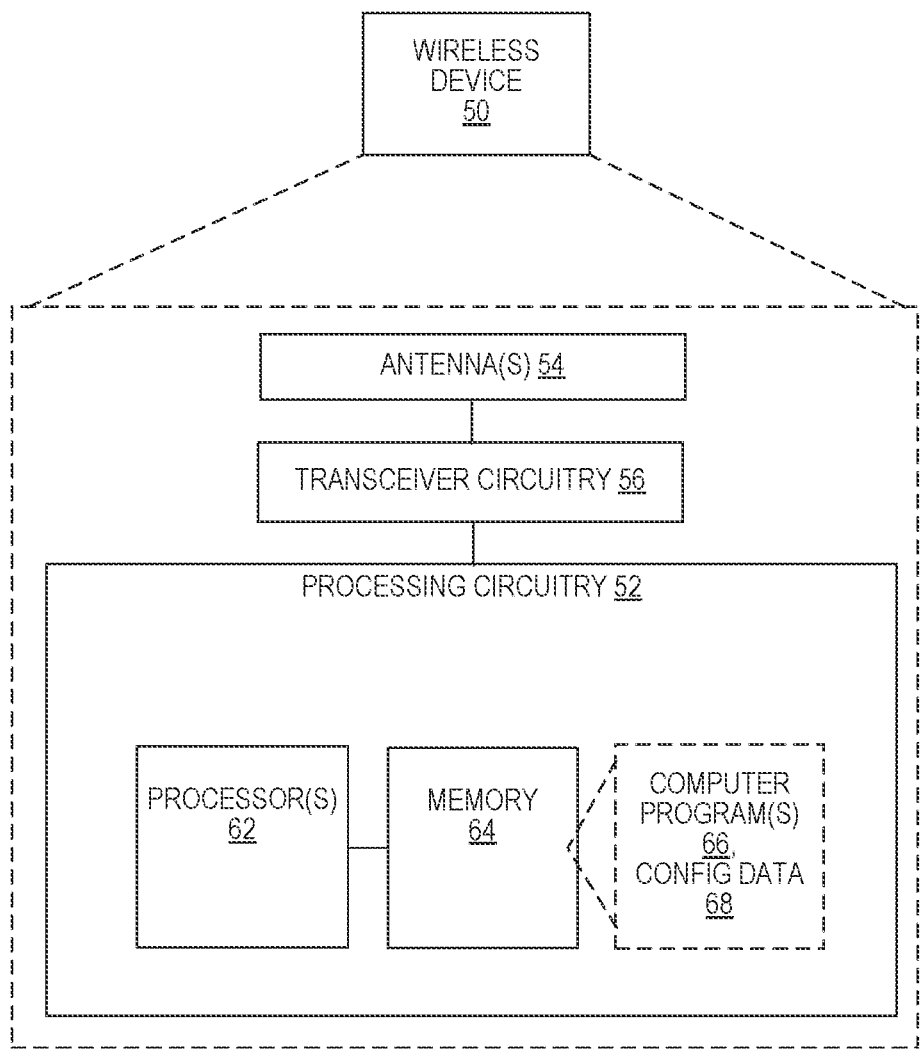
FIG. 14 is a block diagram illustrating an example wireless device, according to some embodiments.

FIG. 14 illustrates an example of the corresponding wireless device 50 that is configured to perform the techniques described herein for the wireless device for handling measurement configurations. The wireless device 50 may also be referred to, in various contexts, as a radio communication device, a UE, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuitry 56. The transceiver circuitry 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

Accordingly, in some embodiments, the processing circuitry 52 of the wireless device 50 is configured to operate in a wireless network and handle transitions from RRC connected state to an RRC inactive state. The processing circuitry 52 is configured to receive, from the wireless network, a message indicating either that the wireless device is to enter the RRC inactive state or that the wireless device is to remain in the RRC inactive state. The processing circuitry 52 is also configured to, responsive to the message, use, for inactive state operation, at least one previously stored inactive state parameter corresponding to a parameter omitted from the message.

Figure 15:
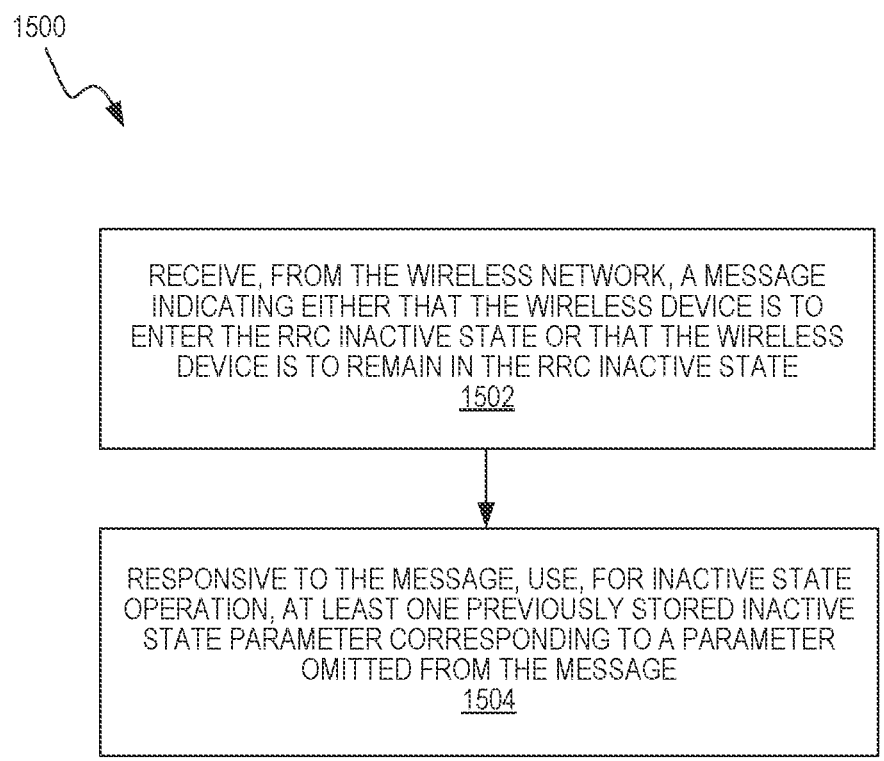
FIG. 15 is a process flow diagram illustrating an example method according to some embodiments, as carried out in the wireless device.

FIG. 15 is a process flow diagram illustrating a corresponding method 1500 implemented in the wireless device 50 for handling transitions from RRC connected state to an RRC inactive state. The method 1500 includes receiving, from the wireless network, a message indicating either that the wireless device is to enter the RRC inactive state or that the wireless device is to remain in the RRC inactive state (block 1502). The method 1500 also includes, responsive to the message, using, for inactive state operation, at least one previously stored inactive state parameter corresponding to a parameter omitted from the message (block 1504).

In some embodiments, the message includes an RRC Resume Reject message or an RRC Release message.

According to some embodiments, the wireless device 50 is configured to perform another method for handling transitions from RRC connected state to an RRC inactive state.

In this case, the processing circuitry 52 is configured to autonomously enter the RRC inactive state and use, for inactive state operation, at least one previously stored inactive state parameter corresponding to a parameter omitted from the message.

The processing circuitry 52 is also configured to perform a corresponding method 1600, according to some embodiments. The method 1600 shown in FIG. 16 includes autonomously entering the RRC inactive state (block 1602) and using, for inactive state operation, at least one previously stored inactive state parameter corresponding to a parameter omitted from the message (block 1604).

In some embodiments, at least one previously stored inactive state parameter includes any one or more of the following: a resume identity for the wireless device; a paging configuration parameter; an RNA parameter; an RNA update configuration parameter; a next hop chaining count for refreshing keys at subsequent resume requests; an early data transmission configuration parameter; a wait time parameter to indicate the UE shall not try to resume or connected to a cell until a wait timer expires; a cell reselection priority parameter; frequency redirection information; a cell quality derivation parameter; and a measurement configuration parameter to be used in the RRC inactive state.

In some embodiments, the message includes one or more inactive state parameters corresponding to previously stored inactive state parameters in the wireless device, and the method 1600 further includes replacing the corresponding previously stored inactive state parameters with the one or more inactive state parameters in the message and using the inactive state parameters in the message for inactive state operation.

According to some embodiments, the wireless device 50 is configured to perform another method for handling transitions from RRC connected state to an RRC inactive state. In this case, the processing circuitry 52 is configured to transition from the RRC inactive state to the RRC connected state and store at least one inactive state parameter for use when subsequently re-entering the RRC inactive state.

The processing circuitry 52 is also configured to perform a corresponding method 1700, according to some embodiments. The method 1700 shown in FIG. 17 includes transitioning from the RRC inactive state to the RRC connected state (block 1702) and storing at least one inactive state parameter for use when subsequently re-entering the RRC inactive state (block 1704). The RRC inactive state may be an RRC_INACTIVE state according to standards for NR or a suspend state according to standards for LTE.

Figure 16:
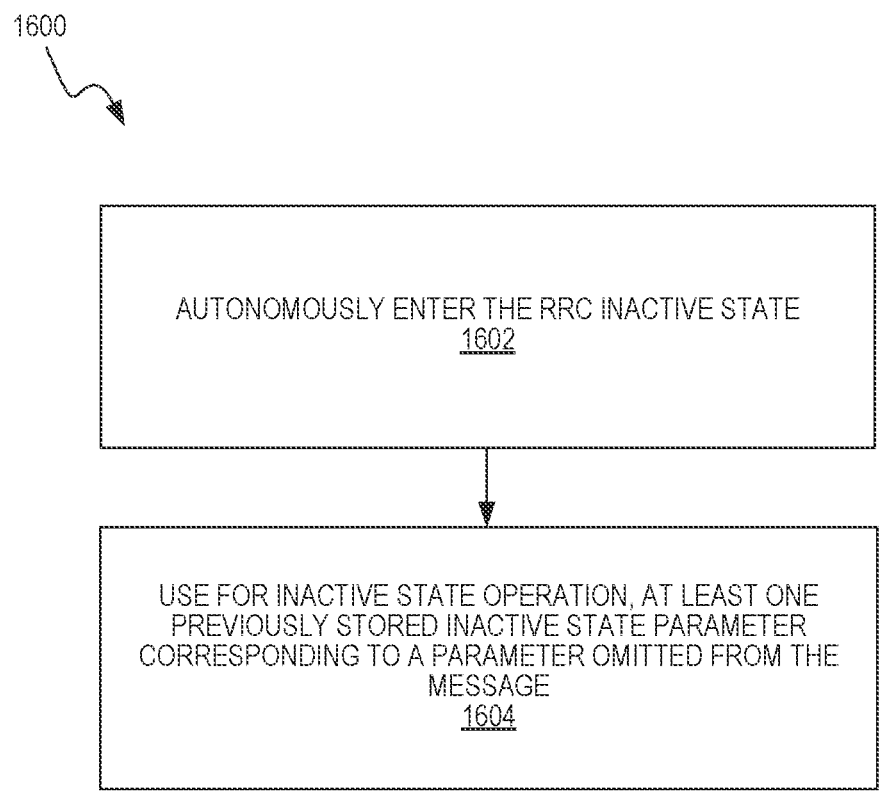
FIG. 16 is a process flow diagram illustrating another example method according to some embodiments, as carried out in the wireless device.
Figure 17:
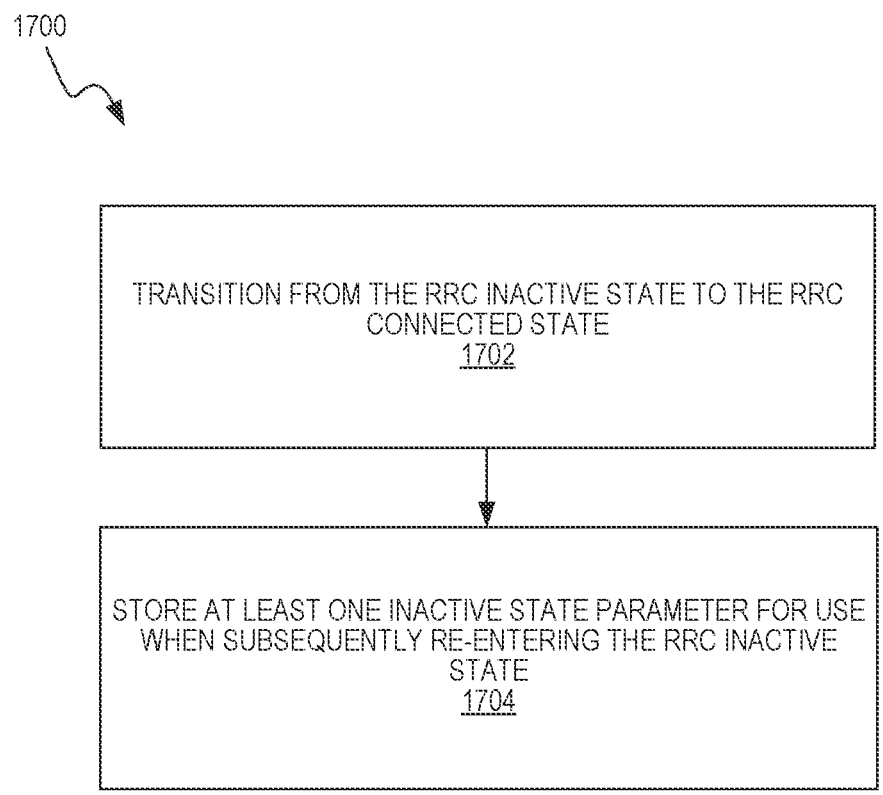
FIG. 17 is a process flow diagram illustrating another example method according to some embodiments, as carried out in the wireless device.

As discussed in detail above, the techniques described herein, e.g., as illustrated in the process flow diagrams of FIGS. 15-17, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 18:
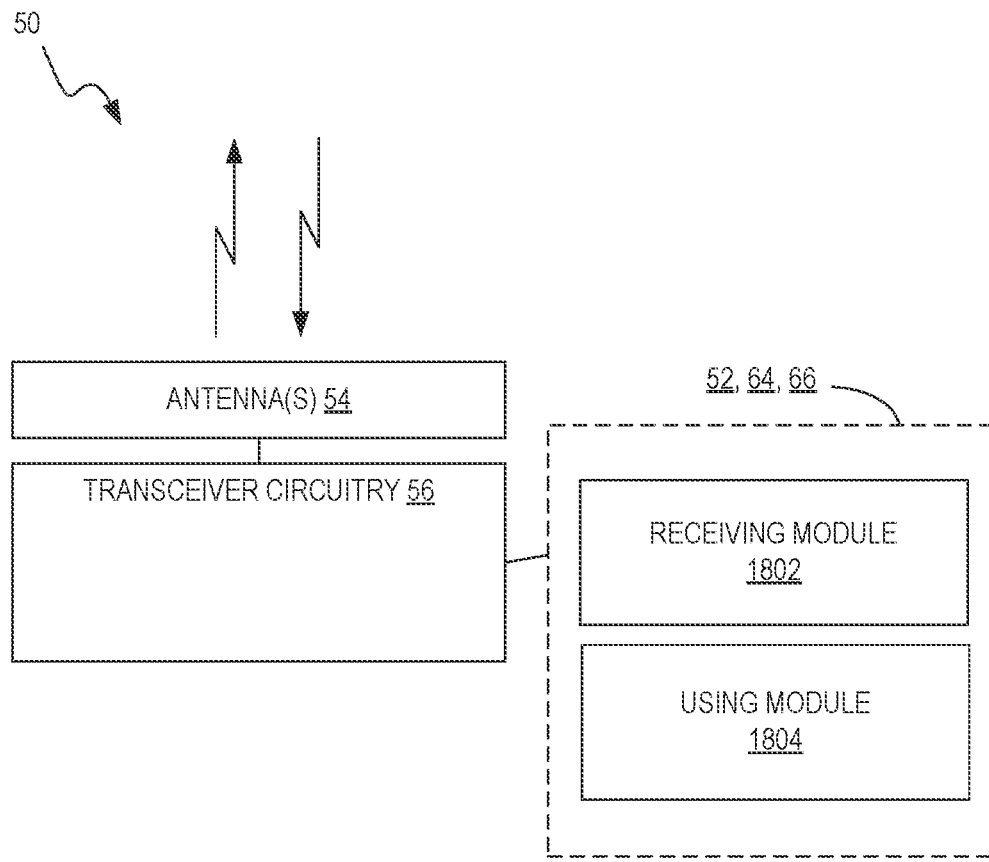
FIG. 18 is a block diagram illustrating a functional representation of an example wireless device.

FIG. 18 illustrates an example functional module or circuit architecture as may be implemented in a wireless device 50. The implementation includes a receiving module 1802 for receiving, from the wireless network, a message indicating either that the wireless device is to enter the RRC inactive state or that the wireless device is to remain in the RRC inactive state. The implementation also includes a using module 1804 for, responsive to the message, using, for inactive state operation, at least one previously stored inactive state parameter corresponding to a parameter omitted from the message.

Figure 19:
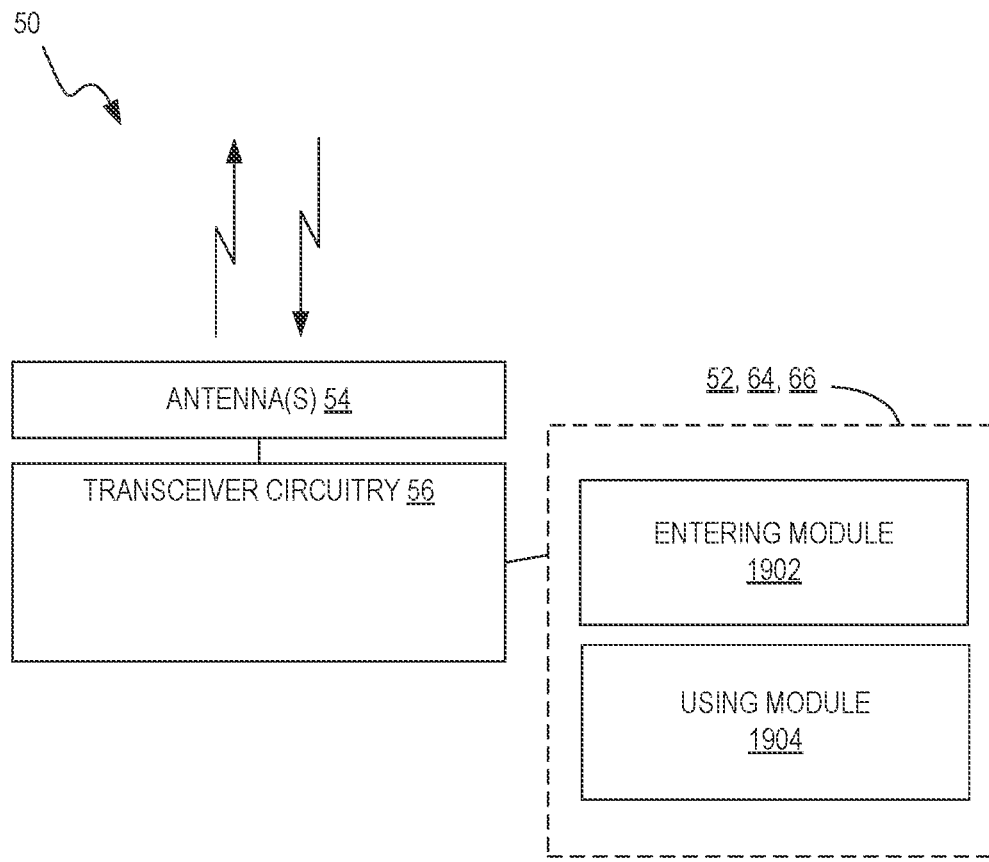
FIG. 19 is a block diagram illustrating another functional representation of an example wireless device.

In another example implementation, shown in FIG. 19, the wireless device 50 includes an entering module 1902 for autonomously entering the RRC inactive state and a using module 1904 for using, for inactive state operation, at least one previously stored inactive state parameter corresponding to a parameter omitted from the message.

Figure 20:
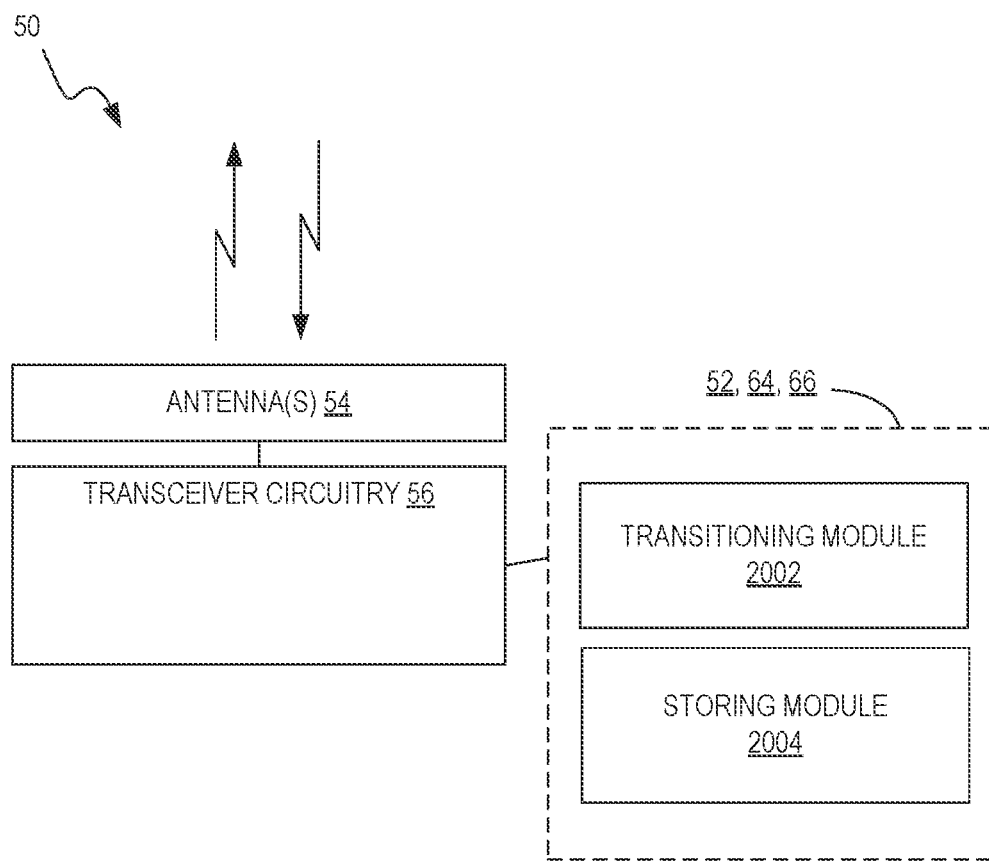
FIG. 20 is a block diagram illustrating another functional representation of an example wireless device.

In another example implementation, shown in FIG. 20, the wireless device 50 includes a transitioning module 2002 for transitioning from the RRC inactive state to the RRC connected state and a storing module 2004 for storing at least one inactive state parameter for use when subsequently re-entering the RRC inactive state.

EXAMPLE EMBODIMENTS

Example embodiments of the techniques and apparatus described herein include, but are not limited to, the following enumerated examples:
(i). A method, in a wireless device operating in a wireless network, for handling transitions from Radio Resource Control (RRC) connected state to an RRC inactive state, the method comprising:
  receiving, from the wireless network, a message indicating either that the wireless device is to enter the RRC inactive state or that the wireless device is to remain in the RRC inactive state; and
  responsive to the message, using, for inactive state operation, at least one previously stored inactive state parameter corresponding to a parameter omitted from the message.
(ii). The method of example embodiment (i), wherein the message comprises an RRC Resume Reject message or an RRC Release message.
(iii). A method, in a wireless device operating in a wireless network, for handling transitions from Radio Resource Control (RRC) connected state to an RRC inactive state, the method comprising:
  autonomously entering the RRC inactive state; and
  using, for inactive state operation, at least one previously stored inactive state parameter corresponding to a parameter omitted from the message.
(iv). The method of any of example embodiments (i)-(iii), wherein the at least one previously stored inactive state parameter comprises any one or more of the following:
  a resume identity for the wireless device;
  a paging configuration parameter;
  a Radio Network Area (RNA) parameter;
  an RNA update configuration parameter;
  a next hop chaining count for refreshing keys at subsequent resume requests;
  an early data transmission configuration parameter;
  a wait time parameter to indicate the UE shall not try to resume or connected to a cell until a wait timer expires;
  a cell reselection priority parameter;
  frequency redirection information;
  a cell quality derivation parameter; and
  a measurement configuration parameter to be used in the RRC inactive state.
(v). The method of any of example embodiments (i)-(iv), wherein the message comprises one or more inactive state parameters corresponding to previously stored inactive state parameters in the wireless device, the method further comprising replacing the corresponding previously stored inactive state parameters with the one or more inactive state parameters in the message and using the inactive state parameters in the message for inactive state operation.
(vi). A method, in a wireless device operating in a wireless network, for handling transitions from Radio Resource Control (RRC) connected state to an RRC inactive state, the method comprising:
  transitioning from the RRC inactive state to the RRC connected state; and
  storing at least one inactive state parameter for use when subsequently re-entering the RRC inactive state.
(vii). The method of any of example embodiments (i)-(vi), wherein the RRC inactive state is an RRC_INACTIVE state according to standards for New Radio (NR).
(viii). The method of any of example embodiments (i)-(vi), wherein the RRC inactive state is a suspend state according to standards for Long-Term Evolution (LTE).
(ix). A wireless device adapted to perform a method according to any one of example embodiments (i)-(viii).
(x) A wireless device comprising transceiver circuitry and processing circuitry operatively associated with the transceiver circuitry and configured to perform a method according to any one of example embodiments (i)-(viii).
(xi). A computer program comprising instructions that, when executed on at least one processing circuit, cause the at least one processing circuit to carry out a method according to any one of example embodiments (i)-(viii).
(xii). A carrier containing the computer program of example embodiment (xi), wherein the carrier is one of an electronic signal, optical signal, radio signal, or computer readable storage medium.
(xiii). A communication system including a host computer comprising:
  processing circuitry configured to provide user data; and
  a communication interface configured to forward user data to a wireless network for transmission to a user equipment (UE) configured for handling transitions from Radio Resource Control (RRC) connected state to an RRC inactive state, wherein the UE comprises a radio interface and processing circuitry, the UE's processing circuitry configured to:
    receive, from the wireless network, a message indicating either that the UE is to enter the RRC inactive state or that the UE is to remain in the RRC inactive state; and
    responsive to the message, use, for inactive state operation, at least one previously stored inactive state parameter corresponding to a parameter omitted from the message.
(xiv). A communication system including a host computer comprising:
  processing circuitry configured to provide user data; and
  a communication interface configured to forward user data to a wireless network for transmission to a user equipment (UE) configured for handling transitions from Radio Resource Control (RRC) connected state to an RRC inactive state, wherein the UE comprises a radio interface and processing circuitry, the UE's processing circuitry configured to:
    autonomously enter the RRC inactive state; and
    use, for inactive state operation, at least one previously stored inactive state parameter corresponding to a parameter omitted from the message.
(xv). A communication system including a host computer comprising:
  processing circuitry configured to provide user data; and
  a communication interface configured to forward user data to a wireless network for transmission to a user equipment (UE) configured for handling transitions from Radio Resource Control (RRC) connected state to an RRC inactive state, wherein the UE comprises a radio interface and processing circuitry, the UE's processing circuitry configured to:
  transition from the RRC inactive state to the RRC connected state; and
  store at least one inactive state parameter for use when subsequently re-entering the RRC inactive state.
(xvi). The communication system of any of example embodiments (xiii)-(xv), further including the UE.
(xvii). The communication system of any of example embodiments (xiii)-(xvi), wherein the cellular network further includes a base station configured to communicate with the UE.
(xviii). The communication system of any of example embodiments (xiii)-(xvii), wherein:
  the processing circuitry of the host computer is configured to execute a host application, thereby providing the user data; and
  the UE's processing circuitry is configured to execute a client application associated with the host application.
(xix). A method implemented in a communication system including a host computer, a base station and a user equipment (UE) configured for handling transitions from Radio Resource Control (RRC) connected state to an RRC inactive state, the method comprising:
  at the host computer, providing user data; and
  at the host computer, initiating a transmission carrying the user data to the UE via a wireless network comprising the base station, wherein the method at the UE comprises:
    receiving, from the wireless network, a message indicating either that the UE is to enter the RRC inactive state or that the UE is to remain in the RRC inactive state; and
    responsive to the message, using, for inactive state operation, at least one previously stored inactive state parameter corresponding to a parameter omitted from the message.
(xx). A method implemented in a communication system including a host computer, a base station and a user equipment (UE) configured for handling transitions from Radio Resource Control (RRC) connected state to an RRC inactive state, the method comprising:
  at the host computer, providing user data; and
  at the host computer, initiating a transmission carrying the user data to the UE via a wireless network comprising the base station, wherein the method at the UE comprises:
    autonomously entering the RRC inactive state; and
    using, for inactive state operation, at least one previously stored inactive state parameter corresponding to a parameter omitted from the message.
(xxi). A method implemented in a communication system including a host computer, a base station and a user equipment (UE) configured for handling transitions from Radio Resource Control (RRC) connected state to an RRC inactive state, the method comprising:
  at the host computer, providing user data; and
  at the host computer, initiating a transmission carrying the user data to the UE via a wireless network comprising the base station, wherein the method at the UE comprises:
    transitioning from the RRC inactive state to the RRC connected state; and
    storing at least one inactive state parameter for use when subsequently re-entering the RRC inactive state.
(xxii). The method of any of example embodiments (xix)-(xxi), further comprising:
  at the UE, receiving the user data from the base station.
(xxiii). A communication system including a host computer comprising:
  a communication interface configured to receive user data originating from a transmission from a user equipment (UE) operating in a wireless network to a base station, the UE's processing circuitry configured to handle transitions from Radio Resource Control (RRC) connected state to an RRC inactive state by:
    receiving, from the wireless network, a message indicating either that the UE is to enter the RRC inactive state or that the UE is to remain in the RRC inactive state; and
    responsive to the message, using, for inactive state operation, at least one previously stored inactive state parameter corresponding to a parameter omitted from the message.
(xxiv). A communication system including a host computer comprising:
  a communication interface configured to receive user data originating from a transmission from a user equipment (UE) operating in a wireless network to a base station, the UE's processing circuitry configured to handle transitions from Radio Resource Control (RRC) connected state to an RRC inactive state by:
    autonomously entering the RRC inactive state; and
    using, for inactive state operation, at least one previously stored inactive state parameter corresponding to a parameter omitted from the message.
(xxv). A communication system including a host computer comprising:
  a communication interface configured to receive user data originating from a transmission from a user equipment (UE) operating in a wireless network to a base station, the UE's processing circuitry configured to handle transitions from Radio Resource Control (RRC) connected state to an RRC inactive state by:
    transitioning from the RRC inactive state to the RRC connected state; and
    storing at least one inactive state parameter for use when subsequently re-entering the RRC inactive state.
(xxvi). The communication system of any of example embodiments (xxiii)-(xxv), further including the UE.
(xxvii). The communication system of any of example embodiment (xxiii)-(xxvi), further including the base station, wherein the base station comprises a radio interface configured to communicate with the UE and a communication interface configured to forward to the host computer the user data carried by a transmission from the UE to the base station.
(xxviii). The communication system of any of example embodiments (xxiii)-(xxvi), wherein:
  the processing circuitry of the host computer is configured to execute a host application; and
  the UE's processing circuitry is configured to execute a client application associated with the host application, thereby providing the user data.

(xxix). The communication system of any of example embodiments (xxiii)-(xxvi), wherein:
  the processing circuitry of the host computer is configured to execute a host application, thereby providing request data; and
  the UE's processing circuitry is configured to execute a client application associated with the host application, thereby providing the user data in response to the request data.

(xxx). A method implemented in a user equipment (UE) operating in a wireless network for handling transitions from Radio Resource Control (RRC) connected state to an RRC inactive state, comprising:
  receiving, from the wireless network, a message indicating either that the UE is to enter the RRC inactive state or that the UE is to remain in the RRC inactive state; and
  responsive to the message, using, for inactive state operation, at least one previously stored inactive state parameter corresponding to a parameter omitted from the message.

(xxxi). A method implemented in a user equipment (UE) operating in a wireless network for handling transitions from Radio Resource Control (RRC) connected state to an RRC inactive state, comprising:
  autonomously entering the RRC inactive state; and
  using, for inactive state operation, at least one previously stored inactive state parameter corresponding to a parameter omitted from the message.

(xxxii). A method implemented in a user equipment (UE) operating in a wireless network for handling transitions from Radio Resource Control (RRC) connected state to an RRC inactive state, comprising:
  transitioning from the RRC inactive state to the RRC connected state; and
  storing at least one inactive state parameter for use when subsequently re-entering the RRC inactive state.

(xxxiii). The method of any of example embodiments (xxx)-(xxxii), further comprising:
  providing user data; and
  forwarding the user data to a host computer via the transmission to the base station.

(xxxiv). A method implemented in a communication system including a host computer, a base station and a user equipment (UE) operating in a wireless network and configured for handling transitions from Radio Resource Control (RRC) connected state to an RRC inactive state, the method comprising:
  at the host computer, receiving user data transmitted to the base station from the UE, wherein the method comprises, at the UE:
    receiving, from the wireless network, a message indicating either that the UE is to enter the RRC inactive state or that the UE is to remain in the RRC inactive state; and
    responsive to the message, using, for inactive state operation, at least one previously stored inactive state parameter corresponding to a parameter omitted from the message.

(xxxv). A method implemented in a communication system including a host computer, a base station and a user equipment (UE) operating in a wireless network and configured for handling transitions from Radio Resource Control (RRC) connected state to an RRC inactive state, the method comprising:
  at the host computer, receiving user data transmitted to the base station from the UE, wherein the method comprises, at the UE:
    autonomously entering the RRC inactive state; and
    using, for inactive state operation, at least one previously stored inactive state parameter corresponding to a parameter omitted from the message.

(xxxvi). A method implemented in a communication system including a host computer, a base station and a user equipment (UE) operating in a wireless network and configured for handling transitions from Radio Resource Control (RRC) connected state to an RRC inactive state, the method comprising:
  at the host computer, receiving user data transmitted to the base station from the UE, wherein the method comprises, at the UE:
    transitioning from the RRC inactive state to the RRC connected state; and
    storing at least one inactive state parameter for use when subsequently re-entering the RRC inactive state.

(xxxvii). The method of any of example embodiments (xxxiv)-(xxxvi), further comprising:
  at the UE, providing the user data to the base station.

(xxviii). The method of any of example embodiments (xxxiv)-(xxxvi), further comprising:
  at the UE, executing a client application, thereby providing the user data to be transmitted; and
  at the host computer, executing a host application associated with the client application.

(xxxix). The method of any of example embodiments (xxxiv)-(xxxvi), further comprising:
  at the UE, executing a client application; and
  at the UE, receiving input data to the client application, the input data being provided at the host computer by executing a host application associated with the client application,
  wherein the user data to be transmitted is provided by the client application in response to the input data.

(xl). A communication system including a host computer comprising:
  a communication interface configured to receive user data originating from a transmission from a user equipment (UE) operating in a wireless network to a base station, the UE's processing circuitry configured to handle transitions from Radio Resource Control (RRC) connected state to an RRC inactive state by:
    receiving, from the wireless network, a message indicating either that the UE is to enter the RRC inactive state or that the UE is to remain in the RRC inactive state; and
    responsive to the message, using, for inactive state operation, at least one previously stored inactive state parameter corresponding to a parameter omitted from the message.

(xli). A communication system including a host computer comprising:
  a communication interface configured to receive user data originating from a transmission from a user equipment (UE) operating in a wireless network to a base station, the UE's processing circuitry configured to handle transitions from Radio Resource Control (RRC) connected state to an RRC inactive state by:
    autonomously entering the RRC inactive state; and
    using, for inactive state operation, at least one previously stored inactive state parameter corresponding to a parameter omitted from the message.

(xlii). A communication system including a host computer comprising:
   a communication interface configured to receive user data originating from a transmission from a user equipment (UE) operating in a wireless network to a base station, the UE's processing circuitry configured to handle transitions from Radio Resource Control (RRC) connected state to an RRC inactive state by:
      transitioning from the RRC inactive state to the RRC connected state; and
      storing at least one inactive state parameter for use when subsequently re-entering the RRC inactive state.
(xliii). The communication system of any of example embodiments (xl)-(xlii), further including the UE.
(xliv). The communication system of any of example embodiments (xl)-(xliii), further including the base station, wherein the base station comprises a radio interface configured to communicate with the UE and a communication interface configured to forward to the host computer the user data carried by a transmission from the UE to the base station.
(xlv). The communication system of any of example embodiments (xl)-(xliii), wherein:
   the processing circuitry of the host computer is configured to execute a host application; and
   the UE's processing circuitry is configured to execute a client application associated with the host application, thereby providing the user data.
(xlvi). The communication system of any of example embodiments (xl)-(xliii), wherein:
   the processing circuitry of the host computer is configured to execute a host application, thereby providing request data; and
   the UE's processing circuitry is configured to execute a client application associated with the host application, thereby providing the user data in response to the request data.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a wireless device operating in a wireless network, for handling transitions from Radio Resource Control (RRC) connected state to an RRC inactive state, the method comprising:
   receiving, from the wireless network, a message indicating either that the wireless device is to enter the RRC inactive state or that the wireless device is to remain in the RRC inactive state; and
   responsive to the message, using, for inactive state operation, at least one previously stored inactive state parameter corresponding to a parameter omitted from the message, wherein the at least one previously stored inactive state parameter comprises any one or more of the following:
      a paging configuration parameter;
      a next hop chaining count for refreshing keys at subsequent resume requests;
      an early data transmission configuration parameter;
      a wait time parameter to indicate the wireless device shall not try to resume or connected to a cell until a wait timer expires;
      a cell reselection priority parameter;
      frequency redirection information; and
      a cell quality derivation parameter.

2. The method of claim 1, wherein the message comprises an RRC Resume Reject message or an RRC Release message.

3. The method of claim 1, wherein the RRC inactive state is an RRC_INACTIVE state according to standards for New Radio (NR).

4. The method of claim 1, wherein the RRC inactive state is a suspend state according to standards for Long-Term Evolution (LTE).

5. The method of claim 1, wherein the message comprises one or more inactive state parameters corresponding to previously stored inactive state parameters in the wireless device, the method further comprising replacing the corresponding previously stored inactive state parameters with the one or more inactive state parameters in the message and using the inactive state parameters in the message for inactive state operation.

6. A wireless device comprising transceiver circuitry and processing circuitry operatively associated with the transceiver circuitry and configured to perform the method of claim 1.

7. A method, in a wireless device operating in a wireless network, for handling transitions from Radio Resource Control (RRC) connected state to an RRC inactive state, the method comprising:
   autonomously entering the RRC inactive state; and
   using, for inactive state operation, at least one previously stored inactive state parameter, wherein the at least one previously stored inactive state parameter comprises any one or more of the following:
      a paging configuration parameter;
      a next hop chaining count for refreshing keys at subsequent resume requests;
      an early data transmission configuration parameter;
      a wait time parameter to indicate the wireless device shall not try to resume or connected to a cell until a wait timer expires;
      a cell reselection priority parameter;
      frequency redirection information;
      a cell quality derivation parameter.

8. The method of claim 7, wherein the RRC inactive state is an RRC_INACTIVE state according to standards for New Radio (NR).

9. The method of claim 7, wherein the RRC inactive state is a suspend state according to standards for Long-Term Evolution (LTE).

10. A wireless device comprising transceiver circuitry and processing circuitry operatively associated with the transceiver circuitry and configured to perform the method of claim 7.

11. A method, in a wireless device operating in a wireless network, for handling transitions from Radio Resource Control (RRC) connected state to an RRC inactive state, the method comprising:
   transitioning from the RRC inactive state to the RRC connected state; and
   storing at least one inactive state parameter for use when subsequently re-entering the RRC inactive state, wherein the at least one inactive state parameter comprises any one or more of the following:

a paging configuration parameter;
an early data transmission configuration parameter;
a wait time parameter to indicate the wireless device shall not try to resume or connected to a cell until a wait timer expires;
a cell reselection priority parameter;
frequency redirection information; and
a cell quality derivation parameter.

12. The method of claim 11, wherein the RRC inactive state is an RRC_INACTIVE state according to standards for New Radio (NR).

13. The method of claim 11, wherein the RRC inactive state is a suspend state according to standards for Long-Term Evolution (LTE).

14. A wireless device comprising transceiver circuitry and processing circuitry operatively associated with the transceiver circuitry and configured to perform the method of claim 11.

15. A method, in a wireless device operating in a wireless network, for handling transitions from Radio Resource Control (RRC) connected state to an RRC inactive state, the method comprising:
    receiving, from the wireless network, a message indicating either that the wireless device is to enter the RRC inactive state or that the wireless device is to remain in the RRC inactive state, wherein the message comprises one or more inactive state parameters corresponding to previously stored inactive state parameters in the wireless device; and
    responsive to the message, using, for inactive state operation, at least one previously stored inactive state parameter corresponding to a parameter omitted from the message, wherein the at least one previously stored inactive state parameter comprises any one or more of the following:
    a paging configuration parameter;
    a next hop chaining count for refreshing keys at subsequent resume requests;
    an early data transmission configuration parameter;
    a wait time parameter to indicate the wireless device shall not try to resume or connected to a cell until a wait timer expires;
    a cell reselection priority parameter;
    frequency redirection information;
    a cell quality derivation parameter; and
    a measurement configuration parameter to be used in the RRC inactive state; and
    replacing the previously stored inactive state parameters corresponding to the one or more inactive state parameters in the message with the one or more inactive state parameters in the message and using the inactive state parameters in the message for inactive state operation.

16. The method of claim 15, wherein the message comprises an RRC Resume Reject message or an RRC Release message.

17. The method of claim 15, wherein the RRC inactive state is an RRC_INACTIVE state according to standards for New Radio (NR).

18. The method of claim 15, wherein the RRC inactive state is a suspend state according to standards for Long-Term Evolution (LTE).

19. A wireless device comprising transceiver circuitry and processing circuitry operatively associated with the transceiver circuitry and configured to perform the method of claim 15.

* * * * *

UNITED STATES PATENT AND TRADEMARK OFFICE
CERTIFICATE OF CORRECTION

PATENT NO. : 11,388,771 B2
APPLICATION NO. : 16/466596
DATED : July 12, 2022
INVENTOR(S) : da Silva et al.

Page 1 of 3

It is certified that error appears in the above-identified patent and that said Letters Patent is hereby corrected as shown below:

On the Title Page

On Page 2, in Item (56), under "OTHER PUBLICATIONS", in Column 2, Line 17, delete "Tsg-ran" and insert -- TSG-RAN --, therefor.

On Page 2, in Item (56), under "OTHER PUBLICATIONS", in Column 2, Line 20, delete "TdocR2-160475," and insert -- Tdoc R2-160475, --, therefor.

On Page 2, in Item (56), under "OTHER PUBLICATIONS", in Column 2, Line 22, delete "Author ," and insert -- Author, --, therefor at each occurrence throughout the patent.

In the Drawings

Figure 2A:
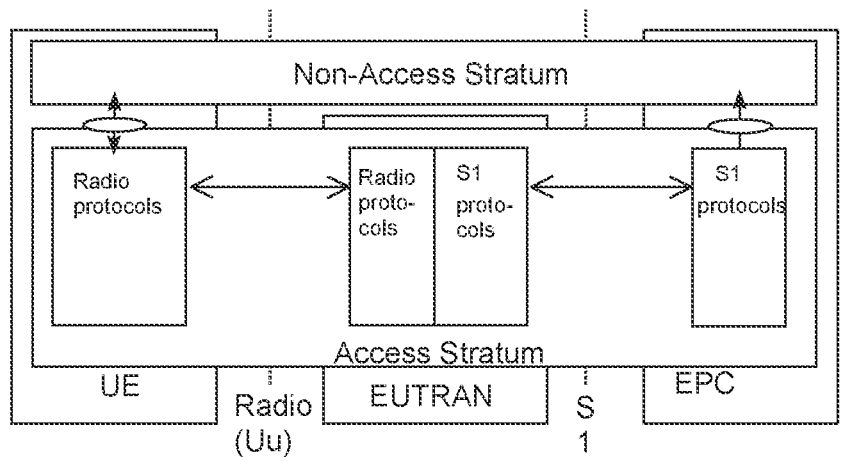
FIG. 2A is a high-level block diagram of an exemplary E-UTRAN architecture in terms of its constituent components, protocols, and interfaces.
Figure 2B:
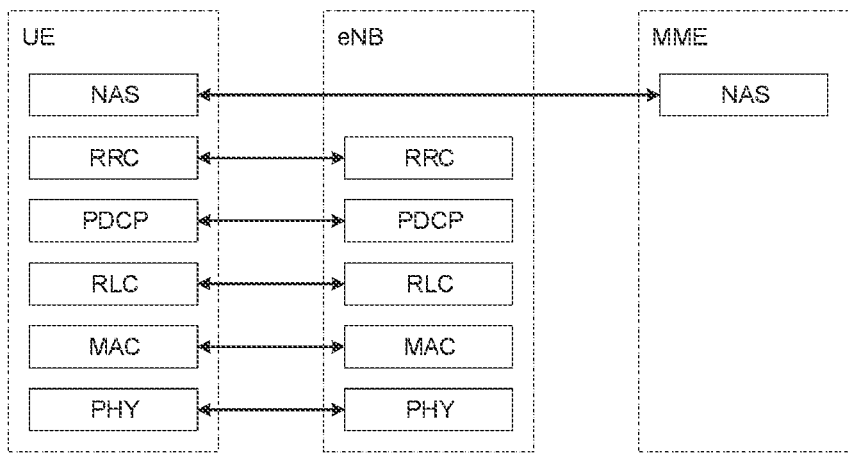
FIG. 2B is a block diagram of exemplary protocol layers of the control-plane portion of the radio (Uu) interface between a user equipment (UE) and the E-UTRAN.
Figure 2C:
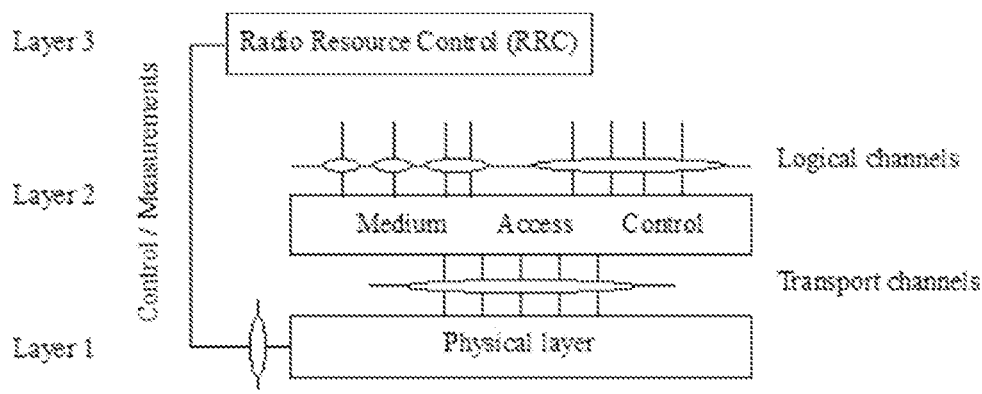
FIG. 2C is a block diagram of an exemplary LTE radio interface protocol architecture from the perspective of the PHY layer.
Figure 3A:
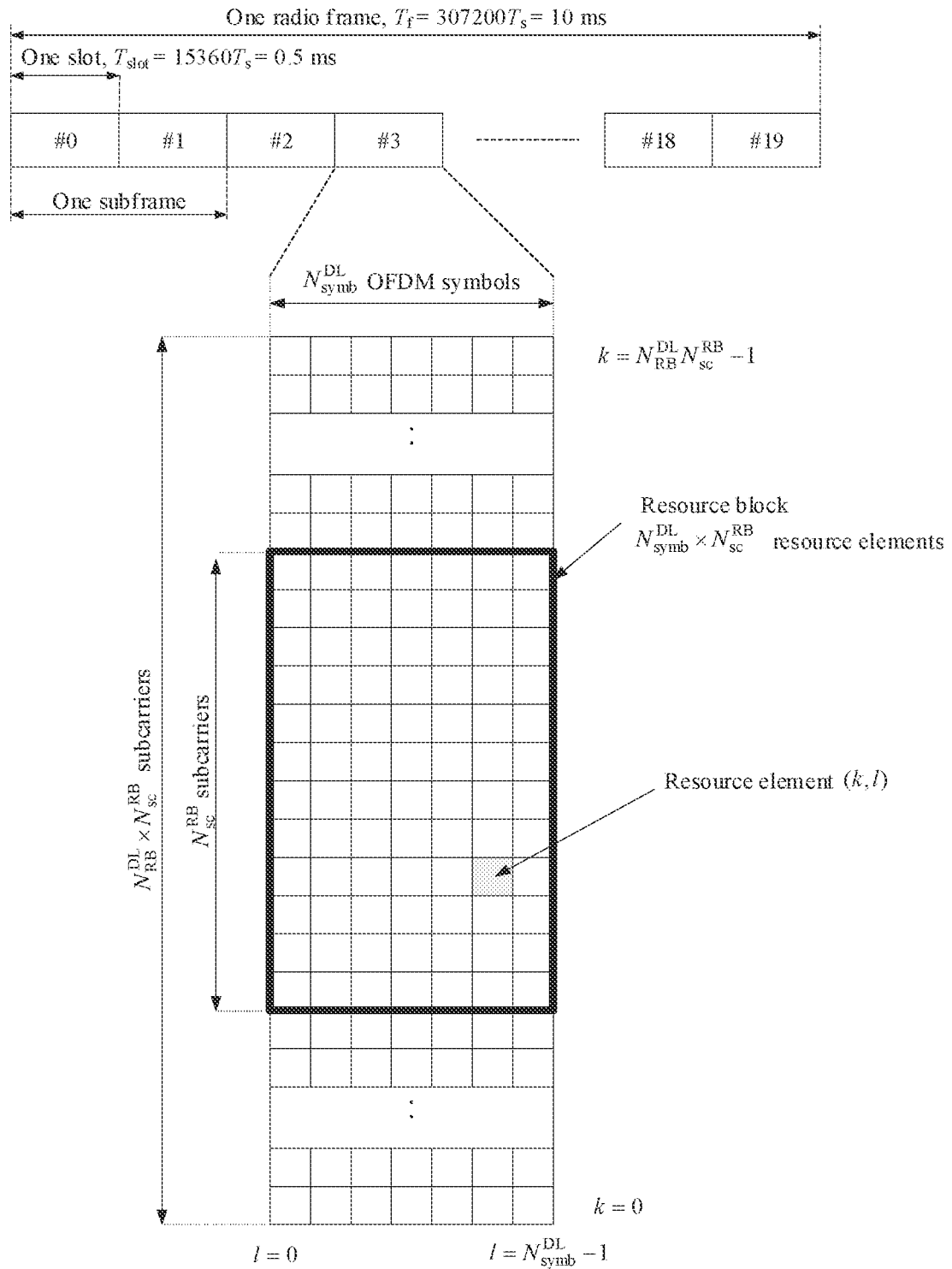
FIGS. 3A and 3B are block diagrams of exemplary downlink and uplink, respectively, LTE radio frame structures used for frequency division duplexing (FDD) operation.
Figure 3B:
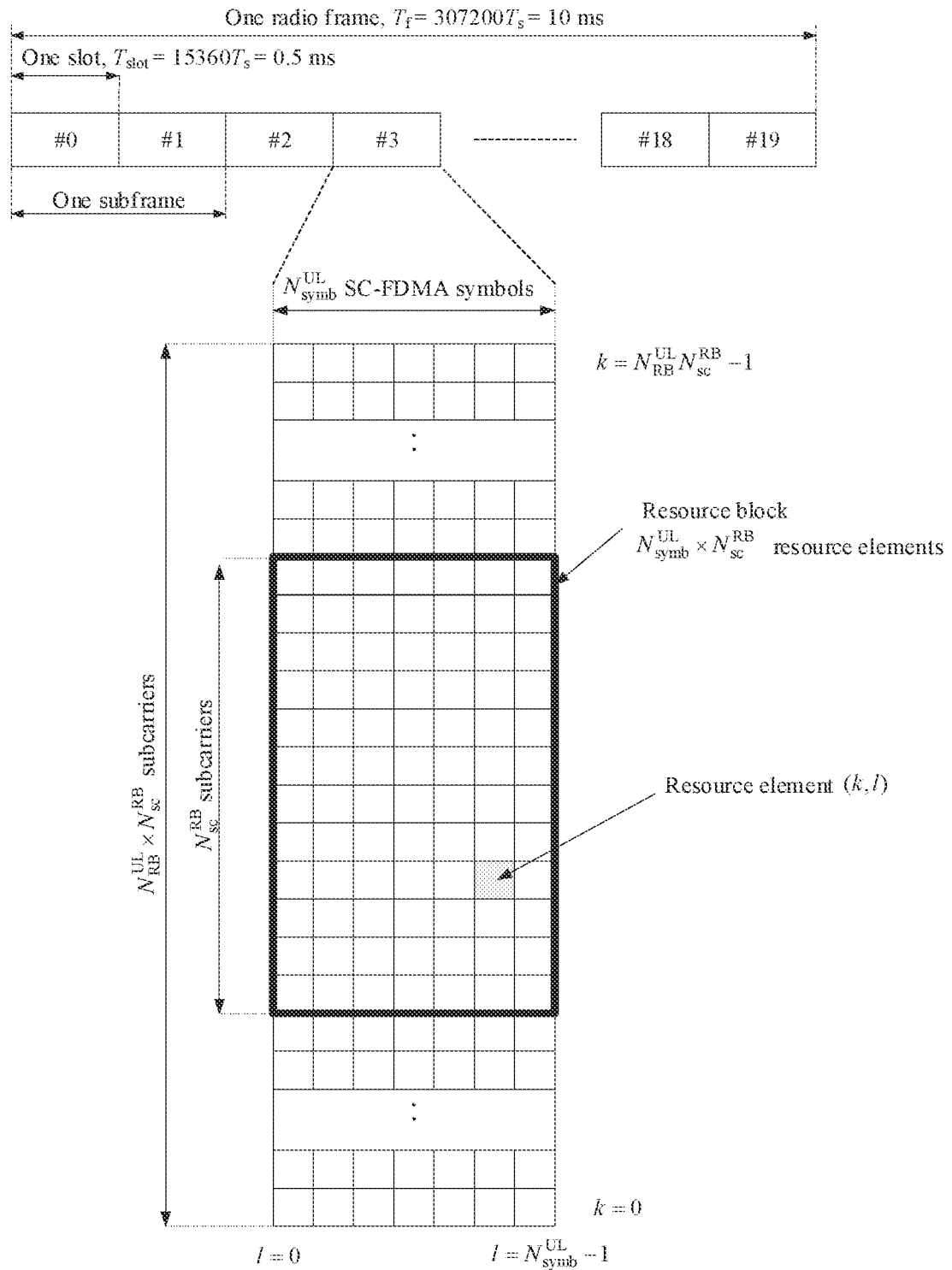
Figure 4:
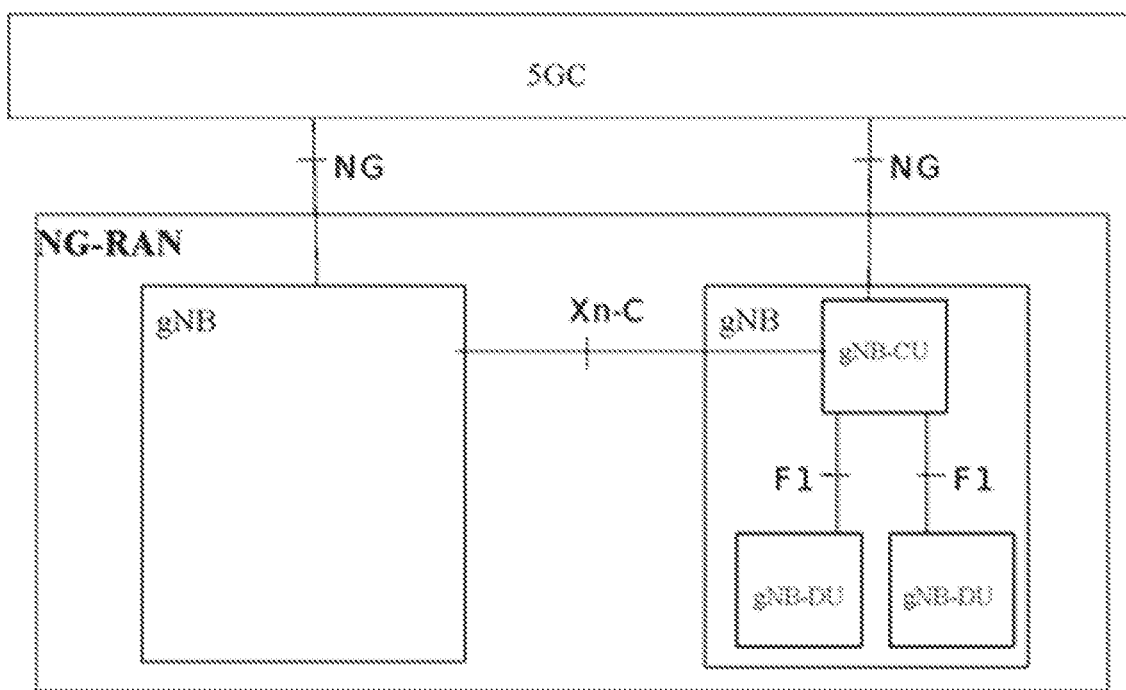
FIG. 4 shows a block diagram of an exemplary 5G logical network architecture.

In Fig. 2A, Sheet 2 of 21, delete "EUTRAN" and insert -- E-UTRAN --, therefor.

Figure 5:
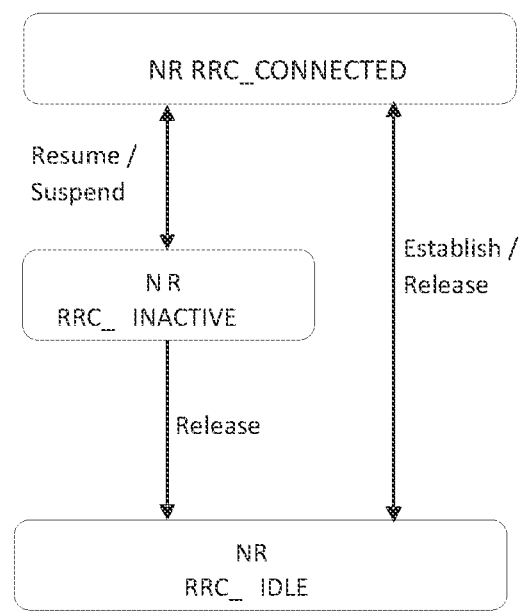
FIG. 5 shows an exemplary state transition diagram, showing possible transitions between RRC states in NR.
Figure 6:
FIG. 6 illustrates RRC connection release.

In Fig. 5, Sheet 6 of 21, delete "N R" and insert -- NR --, therefor.

In Fig. 5, Sheet 6 of 21, delete "RRC_ INACTIVE" and insert -- RRC_INACTIVE --, therefor.

In Fig. 5, Sheet 6 of 21, delete "RRC_ IDLE" and insert -- RRC_IDLE --, therefor.

In Fig. 8, Sheet 9 of 21, delete Tag "88" and insert Tag -- 816 --, therefor.

In Fig. 11, Sheet 12 of 21, delete " 1111 UE provides user data " and insert -- 1120 UE provides user data --, therefor.

Signed and Sealed this
Seventh Day of March, 2023

Katherine Kelly Vidal
*Director of the United States Patent and Trademark Office*

CERTIFICATE OF CORRECTION (continued)
U.S. Pat. No. 11,388,771 B2

In Fig. 13, Sheet 14 of 21, for Tag "44", in Line 1, delete "STORAGE" and insert -- MEMORY --, therefor.

In the Specification

In Column 1, Line 67, delete "Procotol" and insert -- Protocol --, therefor.

In Column 2, Line 15, delete "is carries" and insert -- carries --, therefor.

In Column 3, Line 35, delete "$N^{RC}_{sc}$" and insert -- $N^{RB}_{sc}$ --, therefor.

In Column 4, Line 31, delete "interchangeability.)" and insert -- interchangeably.) --, therefor.

In Column 4, Line 49, delete "that by" and insert -- by --, therefor.

In Column 5, Line 4, delete "form" and insert -- from --, therefor.

In Columns 5 & 6, under Table, Line 30, delete "mechanim" and insert -- mechanism --, therefor.

In Columns 5 & 6, under Table, Line 37, delete "resumeldentity," and insert -- resumeIdentity, --, therefor.

In Columns 7 & 8, under Table-continued, Line 13, delete "SRBO;" and insert -- SRB0; --, therefor.

In Columns 9 & 10, under Table-continued, Line 60, delete "FLMNs" and insert -- PLMNs --, therefor.

In Columns 9 & 10, under Table-continued, Line 61, delete "(SIZE." and insert -- (SIZE --, therefor.

In Column 11, Line 48, delete "response" and insert -- respond --, therefor.

In Column 12, Line 20, delete "nodes (e.g.," and insert -- nodes, --, therefor.

In Column 12, Line 58, delete "RRC" and insert -- the RRC --, therefor.

In Column 12, Line 65, delete "FIG. 9-12" and insert -- FIGS. 9-12 --, therefor.

In Column 15, Line 31, delete "defined" and insert -- defined as --, therefor.

In Columns 17 & 18, under Table-continued, Line 48, delete "PLMN-RAN-AreaCellList =" and insert -- PLMN-RAN-AreaCellList ::= --, therefor.

In Columns 19 & 20, under Table-continued, Line 56, delete "SRBO;" and insert -- SRB0; --, therefor.

In Column 24, Line 3, delete "use" and insert -- user --, therefor.

CERTIFICATE OF CORRECTION (continued)
U.S. Pat. No. 11,388,771 B2

In Column 25, Line 19, delete "(not shown)," and insert -- 1011, --, therefor.

In Column 25, Line 38, delete "first step 2010," and insert -- first step 1110, --, therefor.

In Column 25, Line 44, delete "substep 1130," and insert -- step 1130, --, therefor.

In Column 30, Line 19, delete "(x)" and insert -- (x). --, therefor.